US012786332B2

(12) United States Patent
Nishikawa

(10) Patent No.: US 12,786,332 B2
(45) Date of Patent: Nov. 3, 2026

(54) MANAGEMENT APPARATUS, CONTROL METHOD FOR MANAGEMENT APPARATUS, AND STORAGE MEDIUM

(71) Applicant: CANON KABUSHIKI KAISHA, Tokyo (JP)

(72) Inventor: Satoshi Nishikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 296 days.

(21) Appl. No.: 18/637,542

(22) Filed: Apr. 17, 2024

(65) Prior Publication Data

US 2024/0388669 A1 Nov. 21, 2024

(30) Foreign Application Priority Data

May 15, 2023 (JP) ................................. 2023-080313

(51) Int. Cl.
*H04N 1/00* (2006.01)

(52) U.S. Cl.
CPC ..... *H04N 1/00973* (2013.01); *H04N 1/00344* (2013.01); *H04N 1/0048* (2013.01); *H04N 2201/0094* (2013.01)

(58) Field of Classification Search
CPC ........... H04N 1/00973; H04N 1/00344; H04N 1/0048; H04N 2201/0094
USPC ........................................................ 358/1.13
See application file for complete search history.

(56) References Cited

U.S. PATENT DOCUMENTS

| | | | | |
|---|---|---|---|---|
| 9,658,843 | B2 | 5/2017 | Nishikawa | |
| 11,949,743 | B2 | 4/2024 | Nishikawa | |
| 12,149,410 | B2 * | 11/2024 | Engi | H04L 41/14 |
| 2014/0223512 | A1 * | 8/2014 | Hagiwara | H04L 63/20 726/4 |

FOREIGN PATENT DOCUMENTS

JP 2019053570 A 4/2019

* cited by examiner

*Primary Examiner* — Charlotte M Baker
(74) *Attorney, Agent, or Firm* — Venable LLP

(57) ABSTRACT

A management apparatus that executes a task to distribute settings to network devices has a template management unit 341 configured to manage a template for task creation corresponding to a device model of a network device, a function control unit 33 configured to create a task to distribute the settings to the network device using the template, and a function display unit configured to display a warning screen based on a comparison result of a device model corresponding the template used in the task and a device model of the network device to which the settings are to be distributed, during the creation of the task.

11 Claims, 25 Drawing Sheets

MANAGEMENT APPARATUS, CONTROL METHOD FOR MANAGEMENT APPARATUS, AND STORAGE MEDIUM

BACKGROUND OF THE INVENTION

Field of the Invention

The present invention relates to a technique for managing network devices via a network.

Description of the Related Art

In the related art, a management apparatus for devices that acquires data such as operation information of image forming apparatuses (hereinafter, referred to as devices) such as printers or multifunction peripherals and manages the devices is known. From a viewpoint of an increase in the number of devices to be managed or a reduction in cost or maintenance of a management server, the number of devices manageable with one management apparatus has been expanded. To perform continuous management of the devices, the management apparatus can manage and regularly acquire or distribute a status, device settings, firmware, and the like. Japanese Patent Laid-Open No. 2019-53570 discloses a structure that takes conformance of a password into consideration in distribution of setting information to devices. The management apparatus can also create a template that preliminarily determines a format of acquisition or distribution, and performs an instruction of acquisition or distribution using the template.

In creating a setting template for a device in the management apparatus for devices, a device model is selected. When device setting distribution is performed from the management apparatus to the devices, device selection is performed. Even if a setting distribution task is created using the setting template in the setting distribution, all devices in a device list can be selected as a distribution target, and a setting item of the template not supported by the devices selected as a distribution target results in an error.

SUMMARY OF THE INVENTION

The present invention improves convenience of creation of a setting distribution task using a template.

According to an aspect of the present invention, a management apparatus that executes a task to distribute settings to network devices includes a memory storing instructions, and a processor executing the instructions causing the management apparatus to manage a template for task creation corresponding to a device model of a network device, create a task to distribute the settings to the network device using the template, and display a warning screen based on a comparison result of a device model corresponding the template used in the task and a device model of the network device to which the settings are to be distributed, during the creation of the task.

Further features of the present invention will become apparent from the following description of exemplary embodiments with reference to the attached drawings.

DESCRIPTION OF THE EMBODIMENTS

First Embodiment

Figure 1:
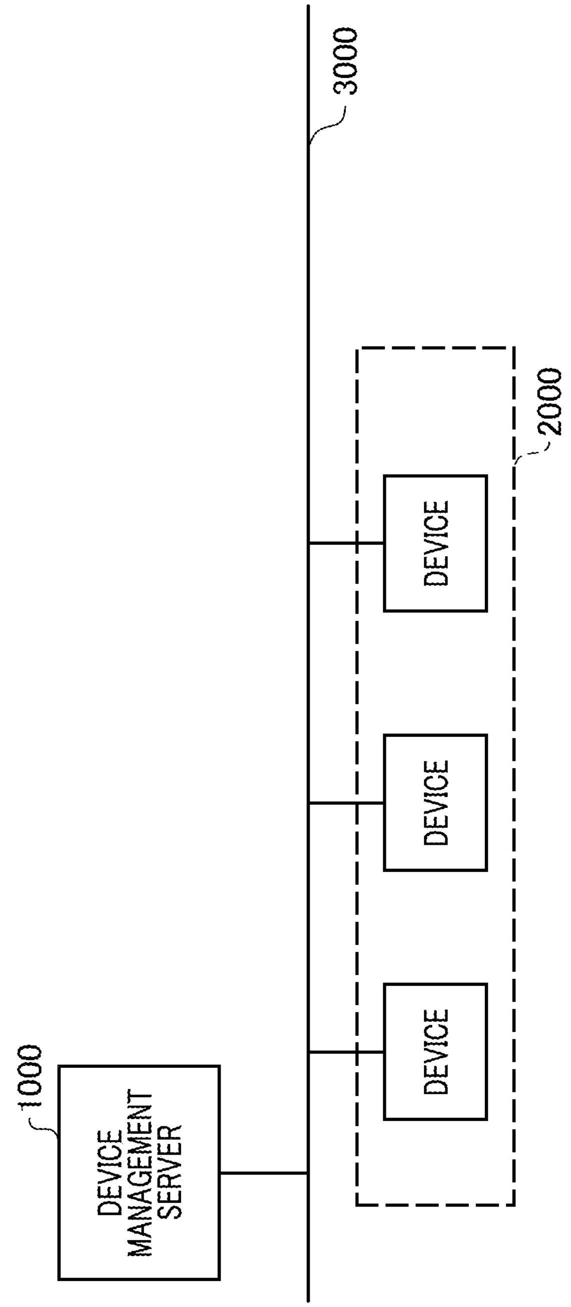
FIG. 1 is a view illustrating a configuration of a device management system.

FIG. 1 is a view illustrating a configuration of a device management system. The device management system manages a plurality of network devices as a management target via a network and provides various services to the network devices. In the present embodiment, although a case where the network device is an image processing apparatus will be described as an example, the present invention is not limited thereto. The network device may be a device that can perform communication, and may be, for example, a printer, a multifunction peripheral, an image forming apparatus, a 3D printer, a laptop, a smartphone, or a smart home appliance.

In the device management system, a device management server 1000 that is a management apparatus managing devices and a plurality of devices 2000 to be managed are communicatively connected via a communication line 3000. The communication line 3000 may be configured such that data transmission and reception can be performed, and may employ any communication system. For example, the communication line 3000 is configured with any of a cellular network, a wireless network, a telephone line, and a dedicated digital line such as LAN, WAN, LTE, and 5G, or a combination thereof.

The device 2000 is an image processing apparatus that can perform network communication. For example, the device 2000 may be a multifunction peripheral (MFP) having a printing function and a scanning function or may be a single-function printer having only a printing function. The device 2000 having the printing function receives print data received via the network and performs printing on actual paper using a known printing technique such as electrophotography or an inkjet technique. The device 2000 having the scanning function scans a paper document via a scanner to convert the document into image data.

The device management server 1000 is a management apparatus that provides a device management service for managing a plurality of devices 2000 as a management target. In the present embodiment, although an example where the device management service is provided by the device management server 1000 will be described, the present invention is not limited thereto. The device management service may be realized by one or more information processing apparatuses, virtual machines using resources provided by a data center including information processing apparatuses (cloud service), or a combination thereof. The device management service that is provided by the device management server 1000 can also be implemented as a Web-based application or can also be used via a Web browser in a client terminal such as a PC.

Figure 2:
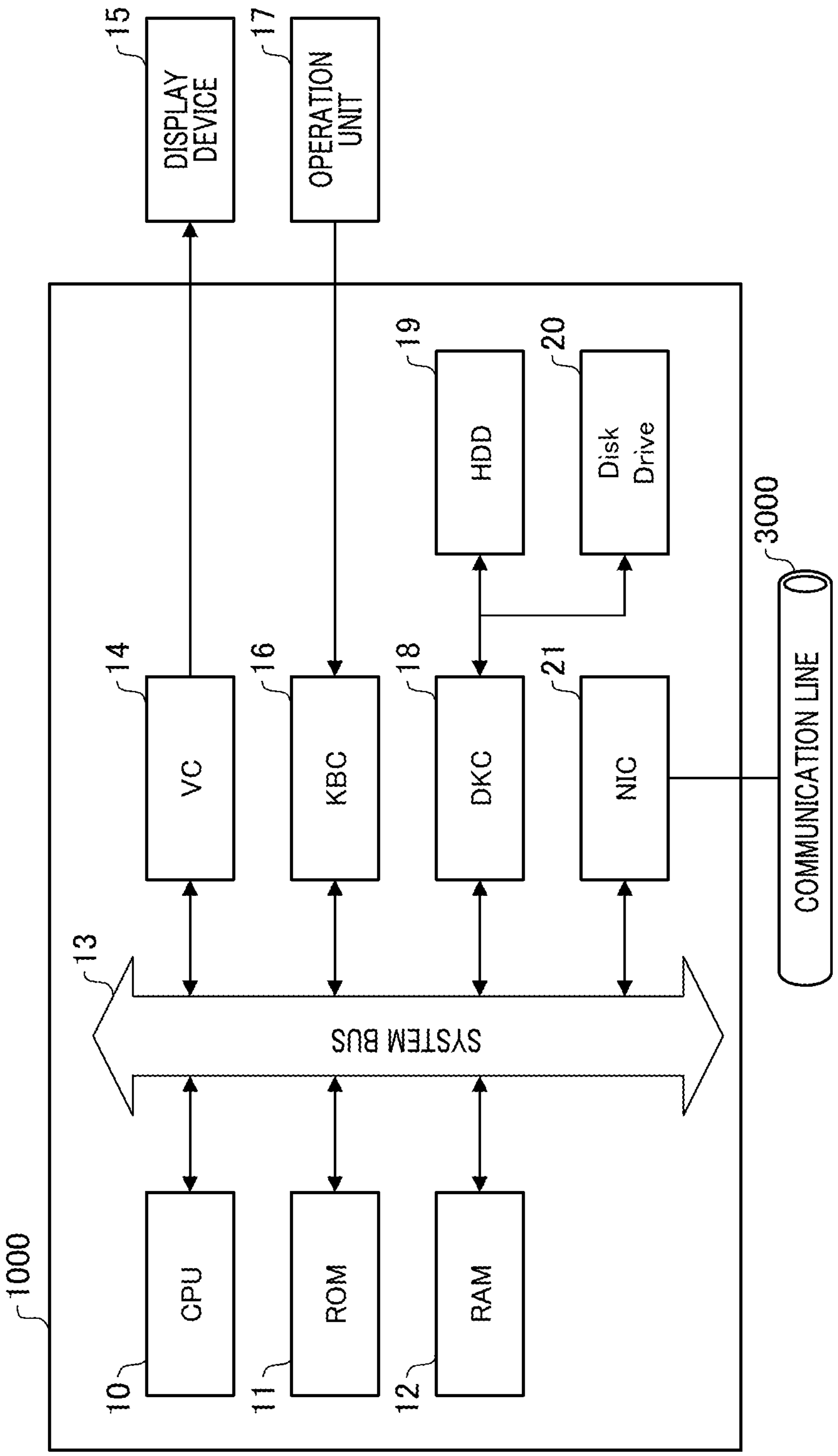
FIG. 2 is a view illustrating a hardware configuration of a device management server.

FIG. 2 is a view illustrating a hardware configuration of the device management server 1000. The device management server 1000 has a CPU 10, a ROM 11, a RAM 12, a VC 14, a KBC 16, a DKC 18, an HDD 19, a disk drive 20, and an NIC 21. The CPU 10 controls the entire device management server 1000. The ROM 11 is a memory dedicated to data readout and stores, for example, a basic control program of the device management server 1000. The RAM 12 is a data readable/writable memory and functions as a work area of the CPU 10. The disk controller (DKC) 18 controls access to a storage device such as the HDD 19. The hard disk drive (HDD) 19 is an example of the storage device and stores various programs, data, and the like. In the present embodiment, although an example where the information processing apparatus includes the HDD 19 as the storage device will be described, the present invention is not limited thereto, and other storage devices such as an SSD may be used. The disk drive 20 can load a storage medium as an external medium such as a CD-ROM, a DVD, a magnetic tape, or a memory card. The CPU 10 executes the program stored in the ROM 11 or the HDD 19 using the RAM 12 as a work area to integrally control each component connected to the system bus 13.

The video controller (VC) 14 is an output interface and controls display on a display device 15. The display device 15 is a display that displays an output from the device management server 1000 to a user, and is, for example, a liquid crystal display (LCD). The keyboard controller (KBC) 15 is an input interface and controls an input from an operation unit 17 to the device management server 1000. The operation unit 17 is an input device that receives an input from the user and is, for example, a keyboard or a pointing device. The display device 15 and the operation unit 17 may be realized by an integrated touch panel. A GUI can be configured as if the user can directly operate a screen displayed on the touch panel by associating input coordinates and display coordinates on the touch panel. The network interface card (NIC) 21 is a communication controller. The device management server 1000 is connected to the communication line 3000 via the NIC 21 and performs data communication with the devices on the communication line 3000.

Figure 3:
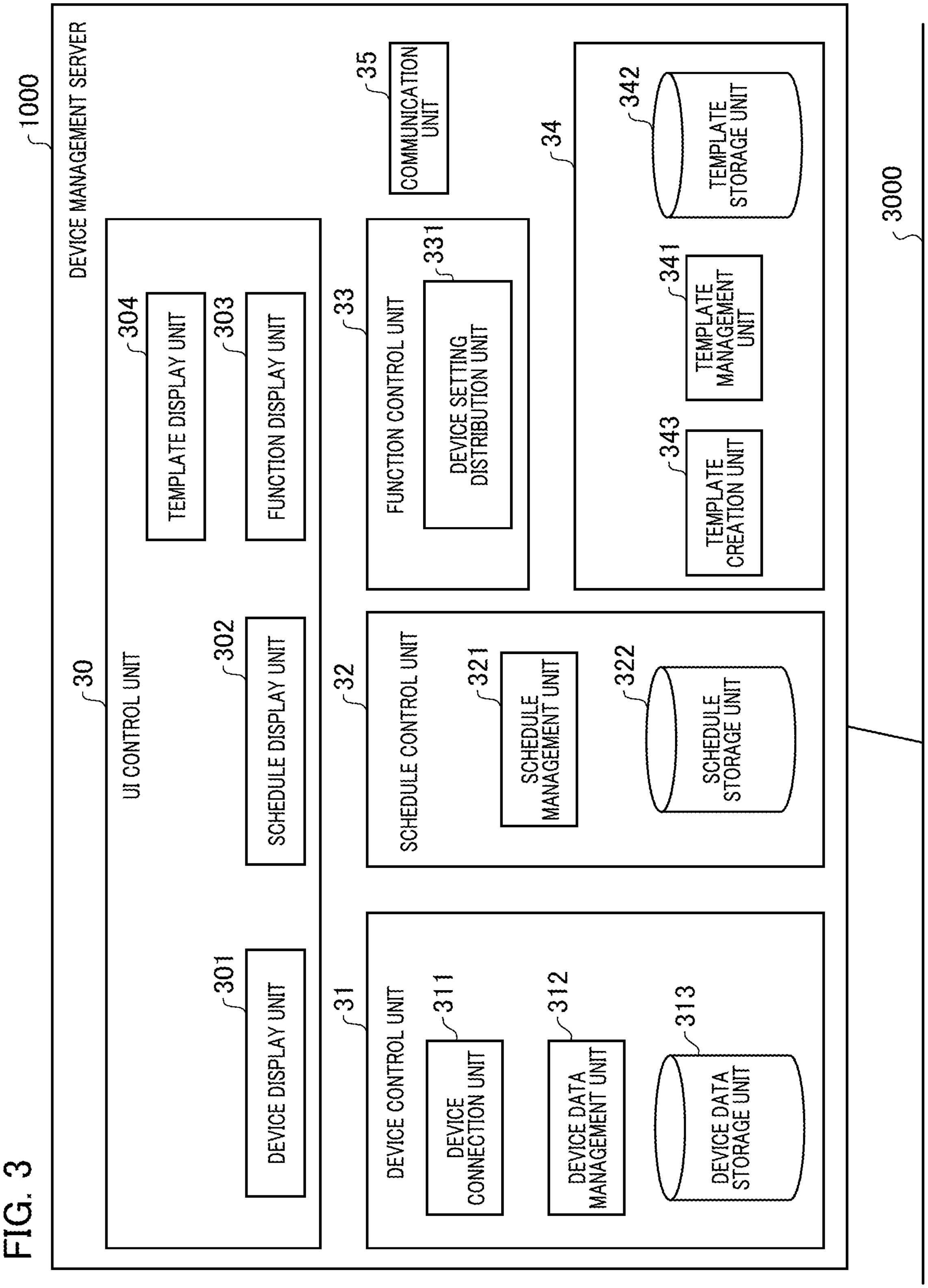
FIG. 3 is a view illustrating a software configuration of the device management server.

FIG. 3 is a view illustrating a software configuration of the device management server 1000. The device management server 1000 has, as software modules, a UI control unit 30, a device control unit 31, a schedule control unit 32, a function control unit 33, a template control unit 34, and a communication unit 35. A software module configuration is realized by the CPU 10 reading out the program stored in the memory (the ROM 11 or the HDD 19) into the RAM 12 and executing the program.

The UI control unit 30 has a device display unit 301, a schedule display unit 302, a function display unit 303, and a template display unit 304. The device display unit 301 controls an UI of the device control unit 31 and further receives an operation of the user on the UI. The schedule display unit 302 controls a UI of the schedule control unit 32 and further receives an operation of the user on the UI. The function display unit 303 controls a UI of the function control unit 33 and further receives an operation of the user on the UI. The template display unit 304 controls a UI of the template control unit 34 and further receives an operation of the user on the UI.

The device control unit 31 manages information of the devices provided by the device management service. The device control unit 31 has a device connection unit 311, a device data management unit 312, and a device data storage unit 313. The device connection unit 311 performs device search, information collection from the devices, and a setting instruction to the devices. An example of the function of the device connection unit 311 is a device search function for the device 2000 by SNMP, IP Broadcast, SLP/Multicast, or the like. In this case, the device connection unit 311 performs search for the devices 2000 at an optional timing. Then, the device connection unit 311 has a function of acquiring or changing device information such as management information base (MIB) security policy information via the communication line 3000. The device connection unit 311 acquires, as a result of the device search, device information such as a device name, a product name, and an IP address, and stores the device information in the device data storage unit 313. The device data management unit 312 manages data of the device data storage unit 313. The device data management unit 312 manages information settings (setting items and setting values) capable of being applied to each device or each of device models of the devices. The device data storage unit 313 stores the device information and the like. The device data storage unit 313 is a data storage medium such as a database operating on the HDD 19.

The schedule control unit 32 manages a schedule of a service provided by the device management service. The schedule control unit 32 has a schedule management unit 321 and a schedule storage unit 322. The schedule management unit 321 cooperates with each function of the function control unit 33, generates and manages a schedule input from the schedule display unit 302, and stores the schedule in the schedule storage unit 322. The schedule storage unit 322 stores the schedule generated by the schedule management unit 321. The schedule storage unit 322 is a data storage medium such as a database operating on the HDD 19.

The function control unit 33 controls distribution of settings to the devices. The function control unit 33 has a device setting distribution unit 331. The device setting distribution unit 331 controls distribution of settings to the devices based on a schedule designated by an input from the function display unit 303 or a distribution task. The device setting distribution unit 331 functions as a task creation unit performing creation of a setting distribution task, along with the schedule management unit 321 and the function display unit 303 controlling display. In performing distribution based on the input from the function display unit 303, a template that is stored in a template storage unit 342 and is preliminarily created is used.

The template control unit 34 creates and manages a template. The template control unit 34 has a template creation unit 343, a template management unit 341, and the template storage unit 342. The template creation unit 343 creates a template based on an instruction of the user. In the device management server 1000, the user can optionally create a template and generate a task using the template. The template management unit 341 manages a template and stores the template in the template storage unit 342. The template management unit 341 manages a template created by the user or a template prepared by a vendor, to create a task. The template storage unit 342 is a data storage medium such as a database operating on the HDD 19. The communication unit 35 controls communication with an external device such as the device 2000 or the like on the network.

Figure 4:
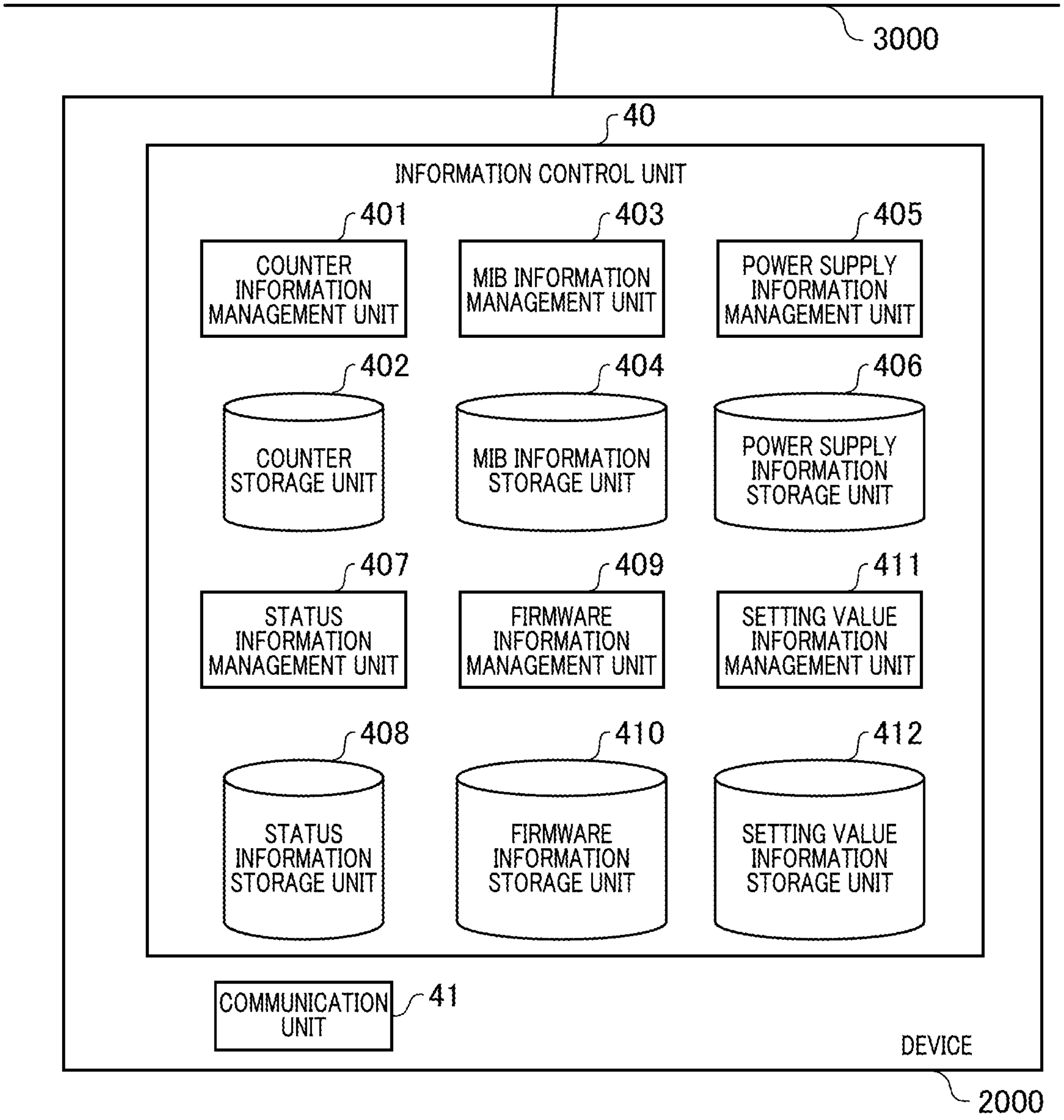
FIG. 4 is a view illustrating a software configuration of a device.

FIG. 4 is a view illustrating a software configuration of the device 2000. A software module configuration is realized by a CPU of the device 2000 executing a program stored in a memory. The device 2000 has, as software modules, an information control unit 40 that manages a plurality of dynamically changing information groups, and a communication unit 41. The information control unit 40 has a counter information management unit 401, an MIB information management unit 403, a power supply information management unit 405, a status information management unit 407, a firmware information management unit 409, and a setting value information management unit 411. The information control unit 40 also has, as storage areas of data corresponding to the management units, a counter storage unit 402, an MIB information storage unit 404, a power supply information storage unit 406, a status information storage unit 408, a firmware information storage unit 410, and a setting value information storage unit 412.

The counter information management unit 401 manages the number of print pages and the like and stores the number of print pages and the like in the counter storage unit 402. The MIB information management unit 403 manages MIB information as the device information described above and stores the MIB information in the MIB information storage unit 404. The power supply information management unit 405 manages power-off information or reboot information and stores the power-off information or the reboot information in the power supply information storage unit 406. The status information management unit 407 manages status information of the device such as online, offline, and error, and stores the status information in the status information storage unit 408.

The firmware information management unit 409 manages information of the configuration or version of firmware of the device 2000 and stores information in the firmware information storage unit 410. Firmware or information distributed for update is also managed by the firmware information management unit 409 and is stored in the firmware information storage unit 410. The setting value information management unit 411 manages setting values regarding various devices such as settings for printing or network-related settings of the devices and stores the setting values in the setting value information storage unit 412. Data that is managed by each management unit is transmitted to the device management server 1000 by SNMP or other protocols according to a request of the device management server 1000. The communication unit 41 controls communication with an external device such as the device management server 1000 on the network. A connection method of the communication unit 41 and the communication line 3000 is, for example, any one of a wireless LAN, a network card (LAN card), and a wired cable.

Figure 5:
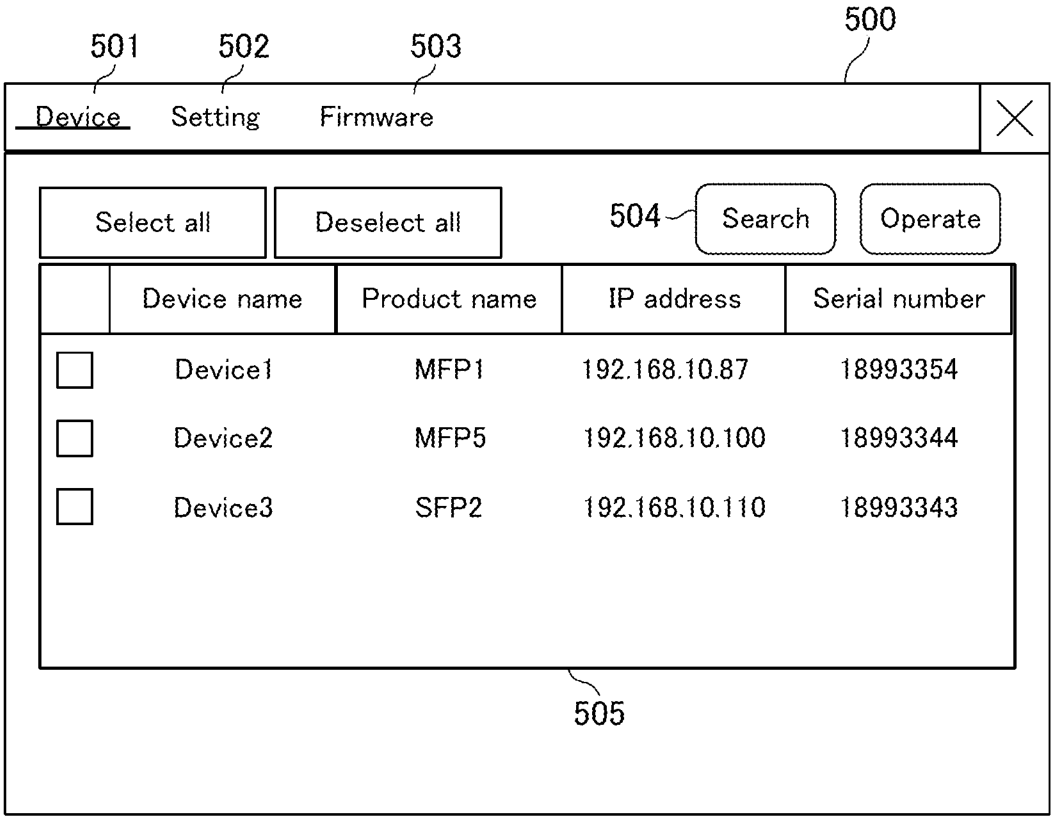
FIG. 5 is a view illustrating an example of a UI after device search.

First, device search will be described with reference to FIG. 5. FIG. 5 is a view illustrating an example of a UI after device search. A search screen 500 is displayed in response to selection of a device tab 501 on a device management screen. On the device management screen, in addition to the device tab 501, a setting tab 502, a firmware tab 503, and the like are selectively displayed. The search screen 500 is a UI that is provided by the UI control unit 30 of the device management server 1000. The device management server 1000 first performs device search in managing the devices. The device management server 1000 searches for devices as a management target on the network. An algorithm for device search includes, for example, SNMP, but any search method may be employed. The device search may be performed according to an instruction of the user every time or may be performed regularly by setting a schedule.

On the search screen 500, a search button 504 is displayed. When the search button 504 is pressed, a search setting screen (not illustrated) is displayed. The user performs search settings on the search setting screen and instructs device search. On the search setting screen, for example, a range of a network for searching devices, a search method, and an IP address to be excluded from the search range can be set. The device management server 1000 performs device search according to the search settings designated by the user.

After the device search, a device list 505 indicating a search result is displayed on the search screen 500. In the device list 505, device information of the found devices is displayed. The device information includes, for example, a device name, a product name, an IP address, and a serial number. In the device information displayed in the device list 505, for example, the device information of the devices acquired by the present search and the device information acquired by the previous search and stored in the device data storage unit 313 are included. The device data management unit 312 manages the devices displayed in the device list 505, that is, all devices as a management target found previously in the device list.

To manage the network devices, the device management server 1000 manages status acquisition of the network devices, setting distribution to the network devices, firmware update, and the like. In the present embodiment, the setting distribution to the network devices by the device management server 1000 will be described. The device management server 1000 distributes the settings to the network devices as a management target as part of device management and manages the settings of the network devices. The device management server 1000 creates a task to distribute the settings and executes the created task to perform the setting distribution to the network devices. In the setting distribution, combinations of setting items and setting values are distributed. In the task creation, a template can be used.

A template for the setting distribution will be described. A template of settings to be distributed is created and stored, so that the same settings can be simply distributed. With this, user's time and effort to perform setting or the occurrence of erroneous setting caused by manual setting can be suppressed. The template includes a combination of a setting item and a setting value, and information of a device model. The template may be created by the user or may be preliminarily prepared by a vendor. The template creation unit 343 creates a template for creating a task to distribute settings according to an instruction of the user. Then, the template management unit 341 stores the created template in the template storage unit 342 and manages the template to create the task. The template management unit 341 can also change some setting values of the template being managed and update the template.

Figure 6A:
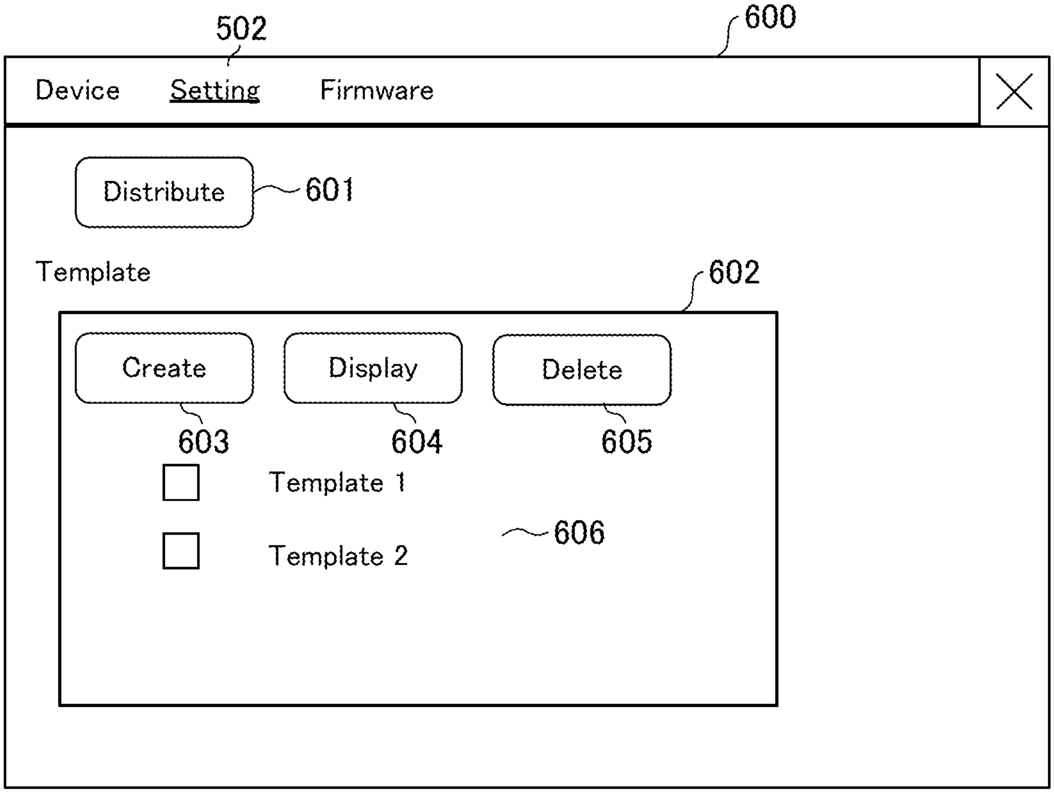
FIGS. 6A and 6B are views illustrating an example of a template selection screen.
Figure 6B:
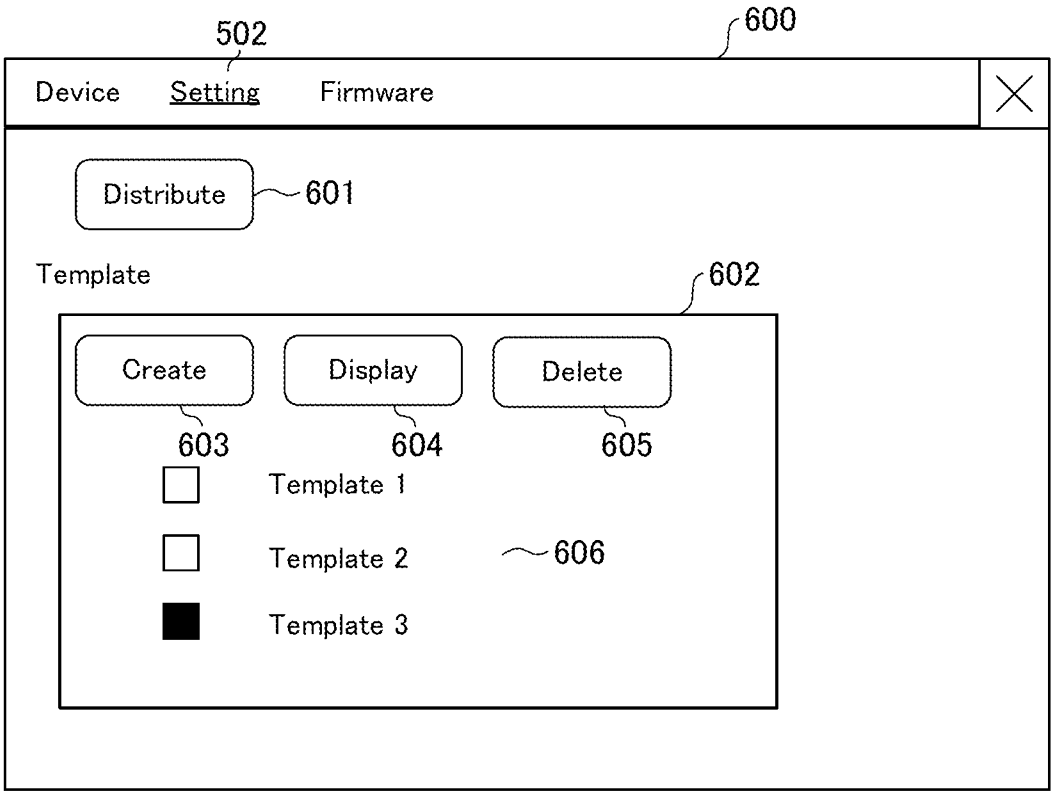

Here, template creation will be described. FIGS. 6A to 9 illustrate transition of a template creation screen. FIGS. 6A and 6B are views illustrating an example of a template selection screen. When pressing on the setting tab 502 is detected, the function display unit 303 displays a template selection screen 600. On the template selection screen 600, a distribute button 601 and a template region 602 are displayed. In the template region 602, a create button 603, a display button 604, a delete button 605, and a template list 606 are displayed. When the create button 603 is pressed, the device management server 1000 starts template creation. FIG. 6A illustrates a template selection screen before creation of a template 3. In the template region 602 of FIG. 6A, a template 1 and a template 2 are selectively displayed. In creating a template, first, a device model is selected, and next, a setting that can be applied to the selected device model is selected. The UI control unit 30 displays a device model selection screen when pressing on the create button 603 is detected.

Figure 7:
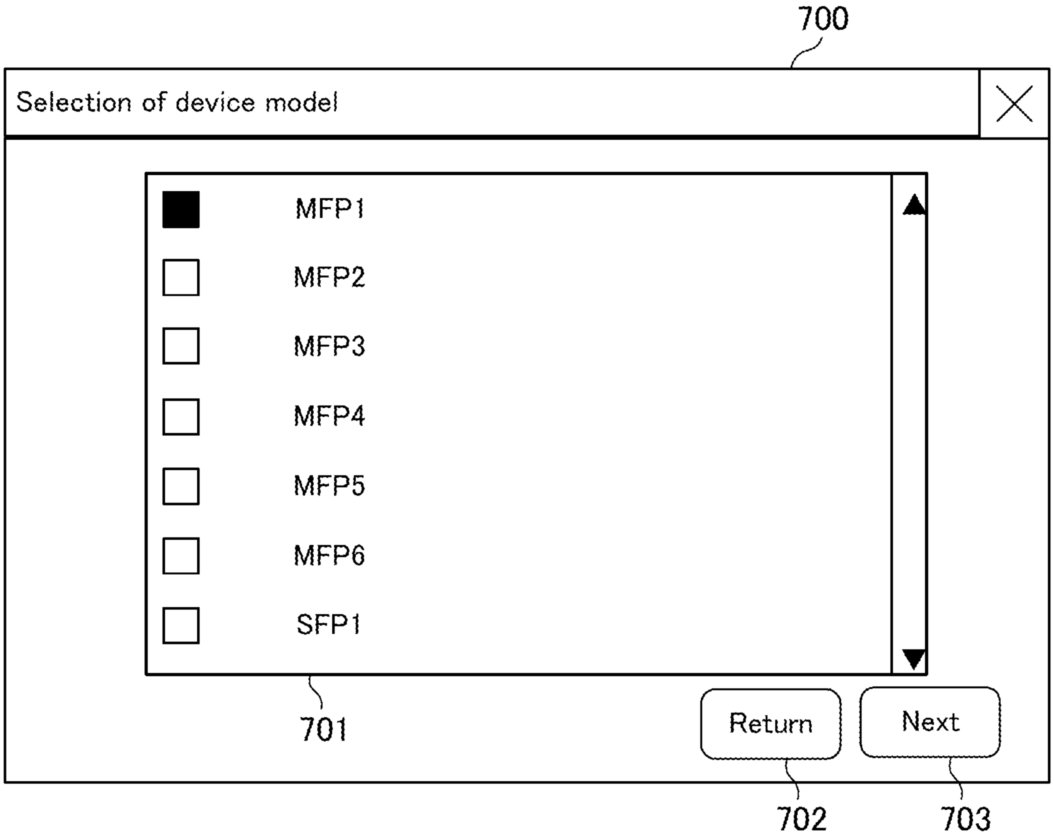
FIG. 7 is a view illustrating an example of a device model selection screen.

FIG. 7 is a view illustrating an example of a device model selection screen. Because setting items and setting values that can be distributed are different depending on device models, in creation of a template for creating a setting distribution task, a device model is first designated. On the device model selection screen 700, for example, a list of all device models that can be a target of the device management service provided by the device management server 1000 is displayed in a device model list 701. The device models that are displayed in the device model list 701 may be limited to device models corresponding to the network devices being currently managed in the device management server 1000. In the device model list 701, the device models may be narrowed down with the name or the range of the network. In narrowing down the devices using the range of the network, for example, the devices can be narrowed down by designating IP addresses or network cards (LAN cards or LAN ports) attached to the devices 2000. The user selects a device model in the device model list 701 and presses a next button 703. In the example illustrated in FIG. 7, "MFP1" is selected as the device model. When pressing on the next button 703 is detected, the UI control unit 30 acquires information of the device model selected in the device model list 701 and displays a setting value selection screen. If a return button 702 is pressed on the device model selection screen 700, the UI control unit 30 displays the template selection screen 600.

Figure 8:
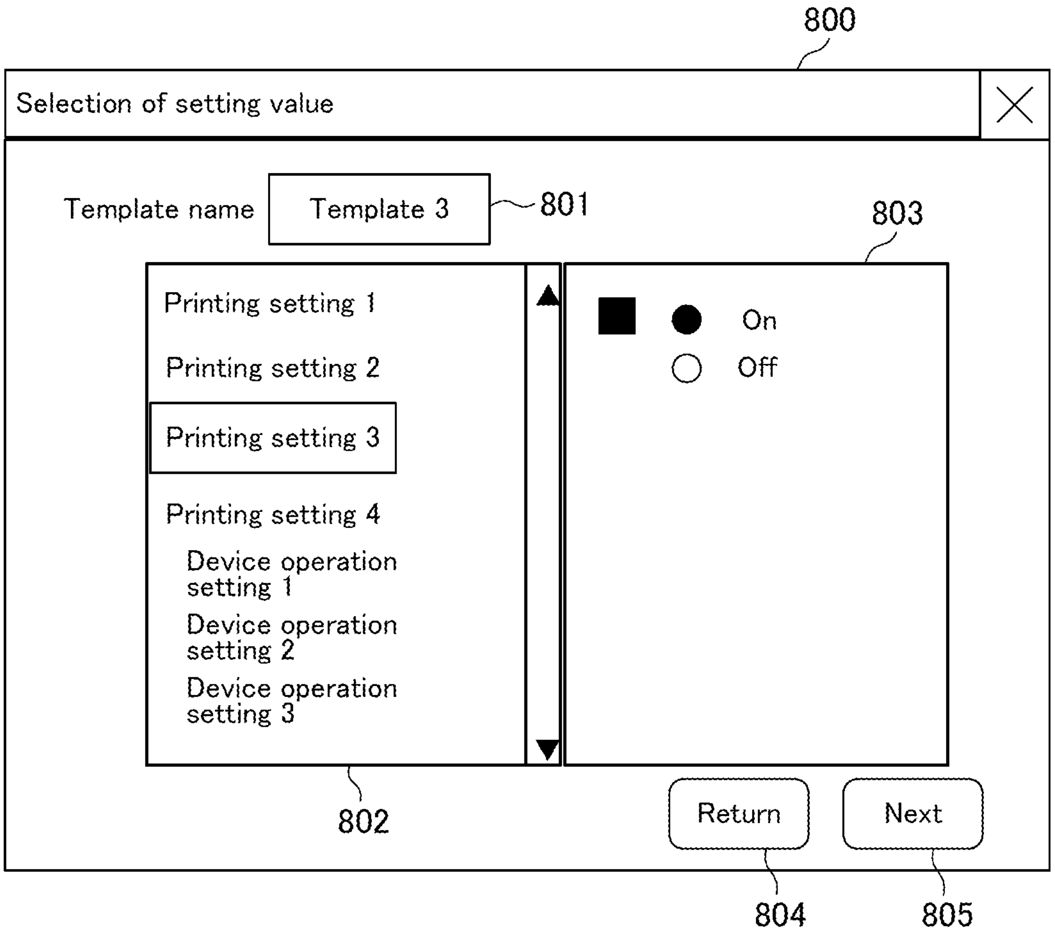
FIG. 8 is a view illustrating an example of a selection screen of a setting value.

FIG. 8 is a view illustrating an example of a setting value selection screen. The setting value selection screen 800 is a screen on which a template name and settings as combinations of setting items and setting values are selected. On the setting value selection screen 800, a template name 801, a setting item list 802, a setting value candidate 803, a return button 804, and a next button 805 are displayed. In the template name 801, a name of a template being created is designated. In the template name 801, for example, the name of the template generated by the template management unit 341 is displayed, but the user may input a name. In the setting item list 802, a list of setting items that can be set with the selected device model is displayed. In the setting item list 802, for example, setting items that can be distributed to the device 2000 as a management target such as items regarding printing settings, items regarding scanning settings, and items regarding security settings are displayed. When a setting item is selected in the setting item list 802, candidates of a setting value corresponding to the setting item are displayed in the setting value candidate 803. The user selects a desired setting value from the setting values displayed in the setting value candidate 803. In the setting value candidate 803, a recommended setting may be displayed to be recognizable by the user. In the setting value candidate 803, a setting value that cannot be set to the selected device model may be brought into non-display and only setting values that can be set may be displayed or a setting value that cannot be set to the selected device model may be displayed in a non-selectable state. A user name or a value of a password or the like may be input as a setting value. In the example illustrated in FIG. 8, a state is illustrated in which "template 3" is selected as the template name, and "on" of "printing setting 3" is selected as the setting item and the setting value. The user can select a plurality of setting items on the setting value selection screen 800 and select the setting value of each setting item. The user selects the template name and the settings of the template, and presses the next button 805. When pressing on the next button 805 is detected, the UI control unit 30 acquires the template name and the settings selected on the setting value selection screen 800, and displays a template confirmation screen. If the return button 804 is pressed, the device model selection screen 700 is displayed.

Figure 9:
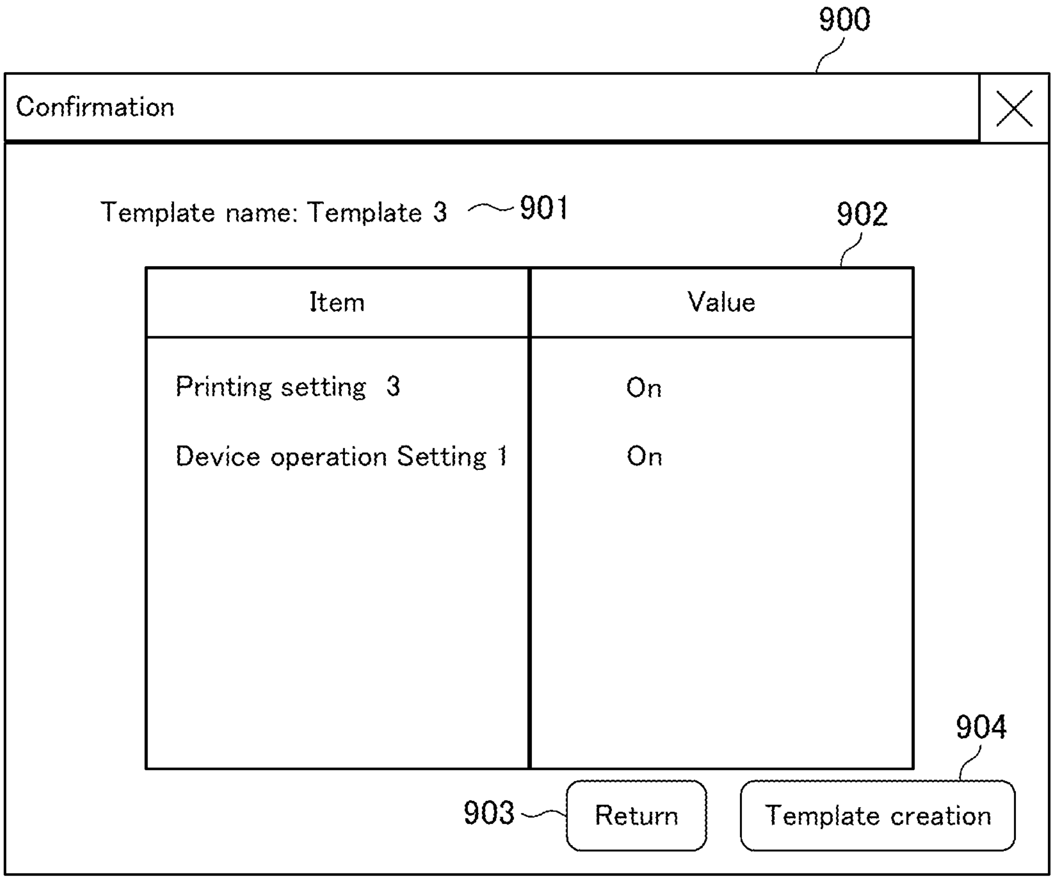
FIG. 9 is a view illustrating an example of a template confirmation screen.

FIG. 9 is a view illustrating an example of a template confirmation screen. A template confirmation screen 900 is a screen for confirming contents of a template to be created. On the template confirmation screen 900, a template name 901 and a setting 902 are displayed. On the template confirmation screen 900, the device model corresponding to the template selected on the device model selection screen 700 may be displayed. In the template name 901, the template name designated in the template name 801 of the setting value selection screen 800 is displayed. In the setting 902, the settings as the combinations of the setting items and the setting values selected on the setting value selection screen 800 are displayed. When pressing on a template creation button 904 is detected by the UI control unit 30, the template creation unit 343 creates the template with the contents displayed on the template confirmation screen 900. Then, the template management unit 341 stores the created template in the template storage unit 342. In the example illustrated in FIG. 9, the template in which the template name is "template 3", "printing setting 3" is set to "on", and "device operation setting 1" is set to "on" is created. If a return button 903 is pressed, the setting value selection screen 800 is displayed.

Figure 10:
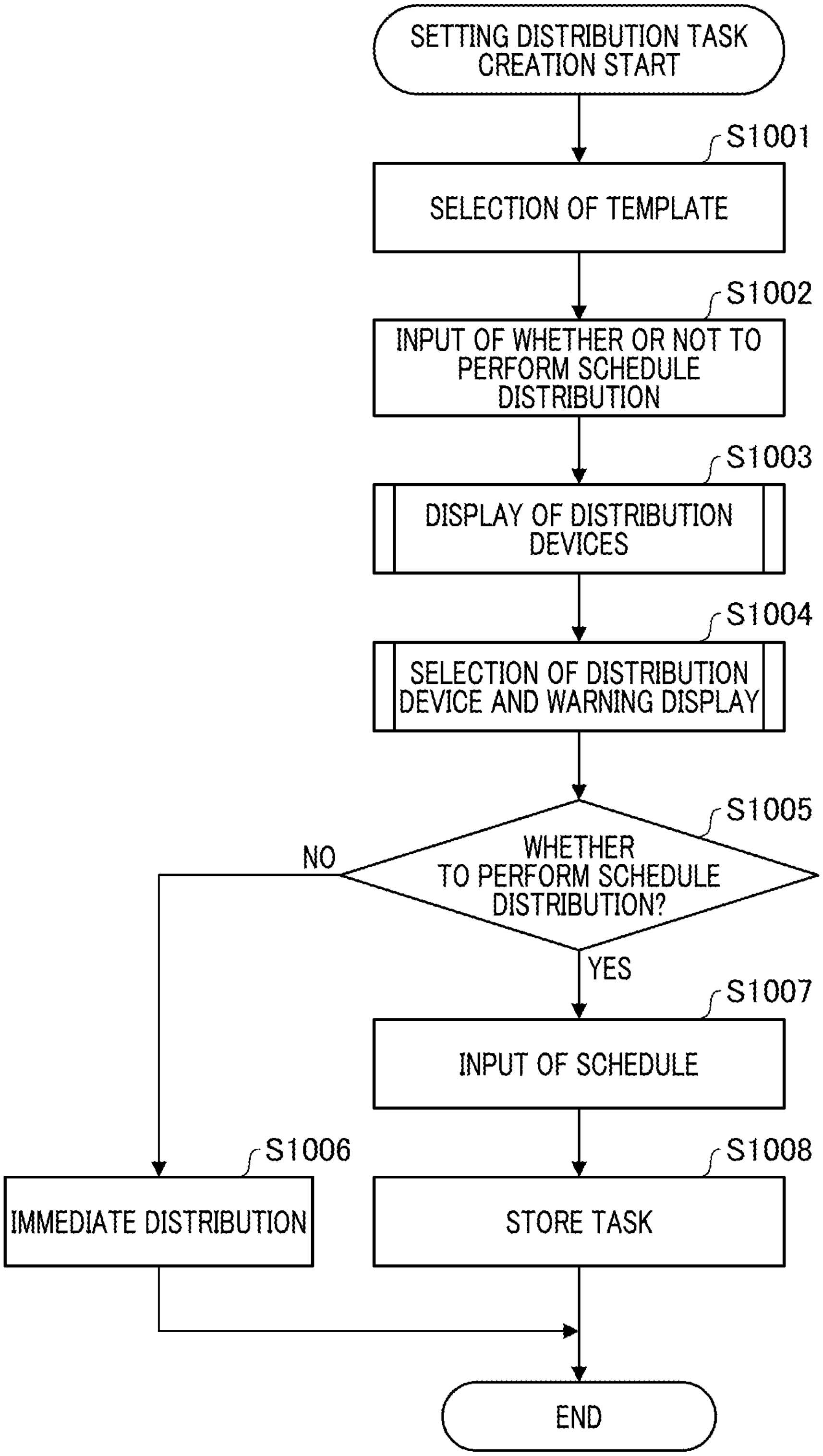
FIG. 10 is a flowchart illustrating a creation process of a setting distribution task in a first embodiment.

Next, a creation process of a task (setting distribution task) to distribute settings to a device will be described. In the present embodiment, a template for creating a task is used to create the setting distribution task. FIGS. 10 to 11B are flowcharts illustrating a creation process of a setting distribution task in the first embodiment. The creation process of the setting distribution task is started in response to detection of pressing on the setting button 601, for example. The creation process of the setting distribution task is realized by the CPU 10 of the device management server 1000 executing the program stored in the memory (the ROM 11 or the HDD 19).

In S1001, the function display unit 303 performs UI display for prompting template selection and receives selection of a template by the user. An example of the UI display for prompting template selection displayed in S1001 is illustrated in FIG. 6B. The template selection screen 600 that is the UI for prompting template selection is displayed in response to the selection of the setting tab 502. FIG. 6B illustrates a template selection screen after the creation of the template 3. When the distribute button 601 is pressed, the device management server 1000 starts the creation of the setting distribution task. If the template is selected in the template list 606 by the user when the distribute button 601 is pressed, the device management server 1000 starts the creation of the setting distribution task based on the selected template. In the example illustrated in FIG. 6B, the template 3 is selected in the template list 606. If a template is not selected by the user when the distribute button 601 is pressed, the setting distribution task can also be created without using a template, but description thereof will be omitted in the present embodiment.

In the template region 602, the create button 603, the display button 604, the delete button 605, and the template list 606 are displayed. When the create button 603 is pressed, the device management server 1000 starts template creation. When the display button 604 is pressed in a state in which the template is selected in the template list 606, the device management server 1000 displays the contents of the selected template. When the delete button 605 is pressed in a state in which the template is selected in the template list 606, the device management server 1000 deletes the selected template from the template storage unit 342. In the template list 606, templates stored in the template storage unit 342 are selectively displayed in a list. In the example illustrated in FIG. 6B, the template 1, the template 2, and the template 3 are displayed in the template list 606, and a state in which the template 3 is selected is illustrated. In S1001, the user selects a template to use from the displayed template list 606 on the template selection screen 600 and presses the distribute button 601. When pressing on the distribute button 601 by the user is detected, the device management server 1000 acquires information of the template selected in the template list 606.

Figure 12:
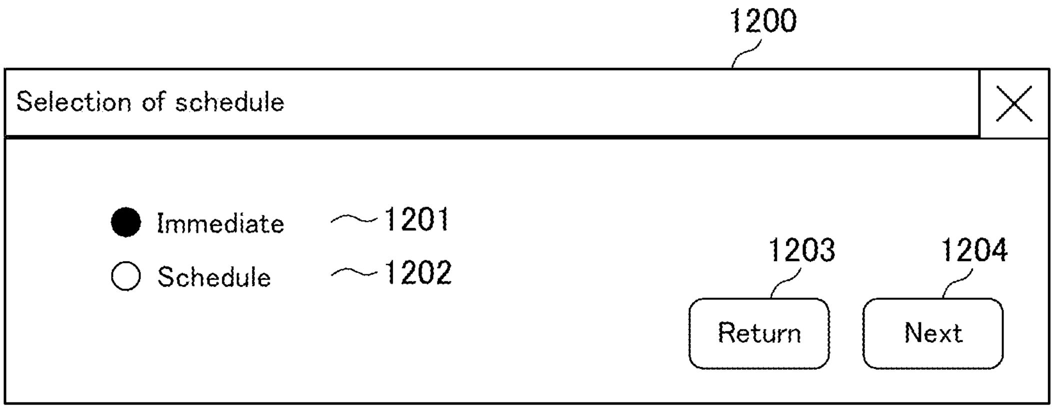
FIG. 12 is a view illustrating an example of a schedule selection screen.

In S1002, the function display unit 303 performs UI display for prompting selection of whether or not to perform schedule distribution, and receives selection of any of schedule distribution by the user and immediate distribution. An example of the UI display for prompting selection of whether or not to perform the schedule distribution is illustrated in FIG. 12. FIG. 12 is a view illustrating an example of a schedule selection screen. On a schedule selection screen 1200 displayed in S1002, immediate distribution and schedule distribution are selectively displayed. The user selects schedule 1202 if performing schedule distribution and selects immediate 1201 if performing immediate distribution, and presses a next button 1204. In the schedule distribution, a task with date and time of firmware distribution designated is created, so that firmware update can be executed at a timing when the device is not used such as after business hours. When the next button 1204 is pressed, the device management server 1000 performs processing of S1003. If a return button 1203 is pressed, the device management server 1000 returns to the processing of S1001 and displays the template selection screen 600.

In S1003, the function display unit 303 performs UI display for prompting selection of a device (device to be distributed device) to which the settings are to be distributed. The function display unit 303 displays a device list to be a target of selection on a screen (distribution device selection screen) that allows the user to select a device to be a target to which the settings are to be distributed. The function display unit 303 may display all found devices in the device list or may determine a device to be displayed according to the template selected in S1001. In the present embodiment, an example where all found devices, that is, all devices as a management target are displayed will be described. Details of the processing of S1003 in the first embodiment will be described with reference to FIG. 11A.

Figure 11A:
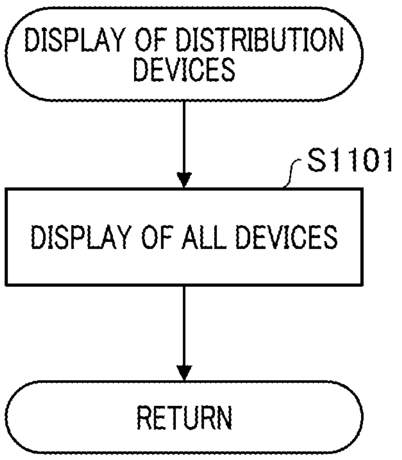
FIGS. 11A and 11B are flowcharts illustrating a creation process of a setting distribution task in the first embodiment.
Figure 11B:
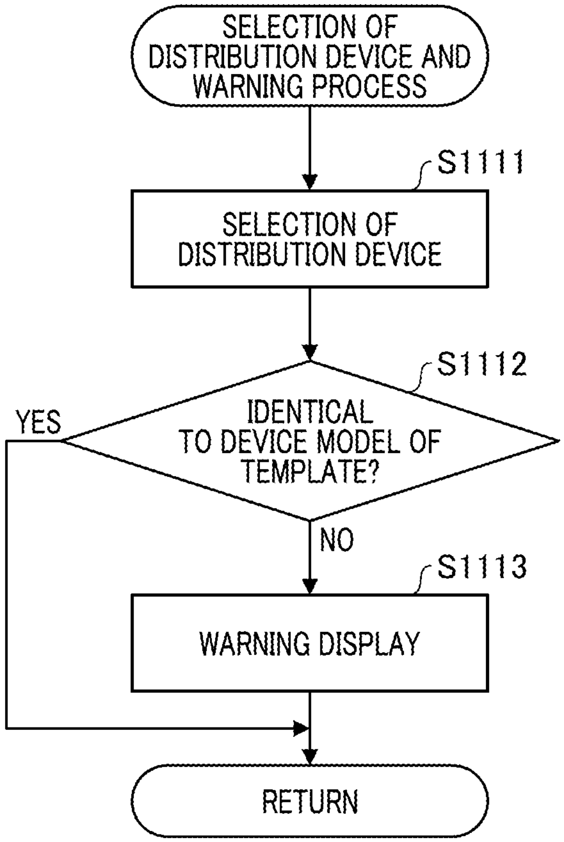
Figure 13:
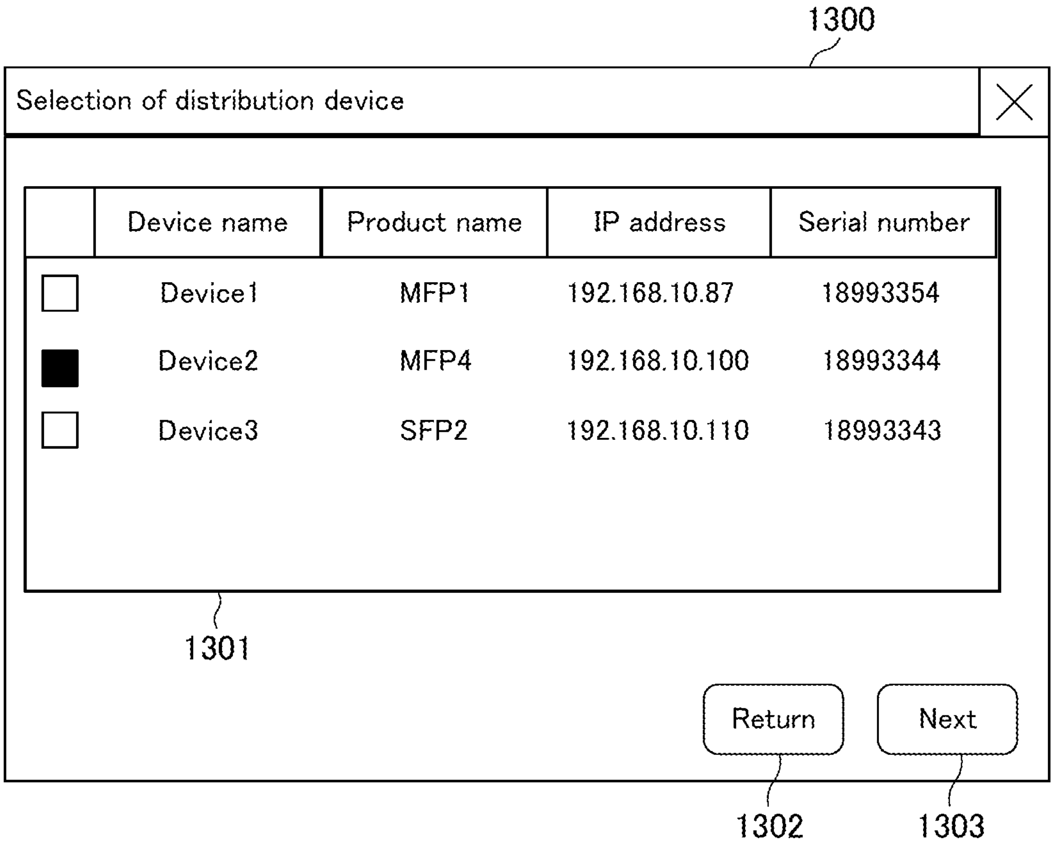
FIG. 13 is a view illustrating an example of a distribution device selection screen.

FIG. 11A is a flowchart illustrating a display process of a distribution device selection screen in the first embodiment. In S1101, the function display unit 303 performs a process of displaying all devices found already, that is, all devices in the device list on the distribution device selection screen. An example of the distribution device selection screen is illustrated in FIG. 13. FIG. 13 is a view illustrating an example of a distribution device selection screen. On a distribution device selection screen 1300, a device list 1301, a return button 1302, and a next button 1303 are displayed. In the device list 1301, candidates of a device to which the settings are to be distributed are selectively displayed in a list. In the first embodiment, all found devices, that is, all devices as a management target are displayed in the device list 1301. In the example illustrated in FIG. 13, "Device 1" with a product name (device model) of "MFP4", "Device 2" with a product name of "MFP4", and "Device 3" with a product name of "SFP2" are displayed in the device list 1301. The user selects a distribution device to which the settings are to be distributed, from the devices displayed in the device list 1301. If the next button 1303 is pressed in a state in which a device is selected in the device list 1301, the device management server 1000 performs processing of S1004. If the return button 1302 is pressed, the device management server 1000 returns to the processing of S1002 and displays the schedule selection screen (FIG. 12).

In S1004, the function display unit 303 and the device setting distribution unit 331 determine whether or not to perform a warning based on the distribution device, and perform a process of displaying a warning if determination is made to perform a warning. The function display unit 303 compares the device model of the template with the device model of the selected distribution device and displays a warning screen based on a comparison result. The comparison herein is to determine whether or not the device model of the template and the device model of the selected distribution device are identical. Details of the processing of S1004 in the first embodiment will be described with reference to FIG. 11B. FIG. 11B is a flowchart illustrating a warning process in the first embodiment. In S1111, the function display unit 303 acquires information of the distribution device selected in the device list 1301 of the distribution device selection screen 1300. In the example illustrated in FIG. 13, "Device 2" with a product name of "MFP4" is selected.

In S1112, the device setting distribution unit 331 determines whether or not the device model of the template selected in S1001 is identical to that of the distribution device. The device model corresponds to the product name (model name). For example, while the template 3 selected in S1001 is created to have the device model of "MFP1", the distribution device selected in S1003 has the product name of "MFP4", and the device setting distribution unit 331 determines that the device models are not identical. If the device model of the template is identical to that of the distribution device, the process returns to the flowchart of FIG. 10, and processing of S1005 is performed. That is, if the device model of the template is identical to that of the distribution device, warning display is not performed. On the other hand, if the device model of the template is not identical to that of the distribution device, processing of S1113 is performed. In S1113, the function display unit 303 performs warning display. With the present processing, if the device model of the template is different from that of the distribution device, warning display can be performed, and the user can notice that the device model of the template is different from that of the distribution device, immediately after the selection of the distribution device during the creation of the task by the warning. Then, the user can return and select a template and a distribution device again as needed immediately after the selection of the distribution device.

Figure 14:
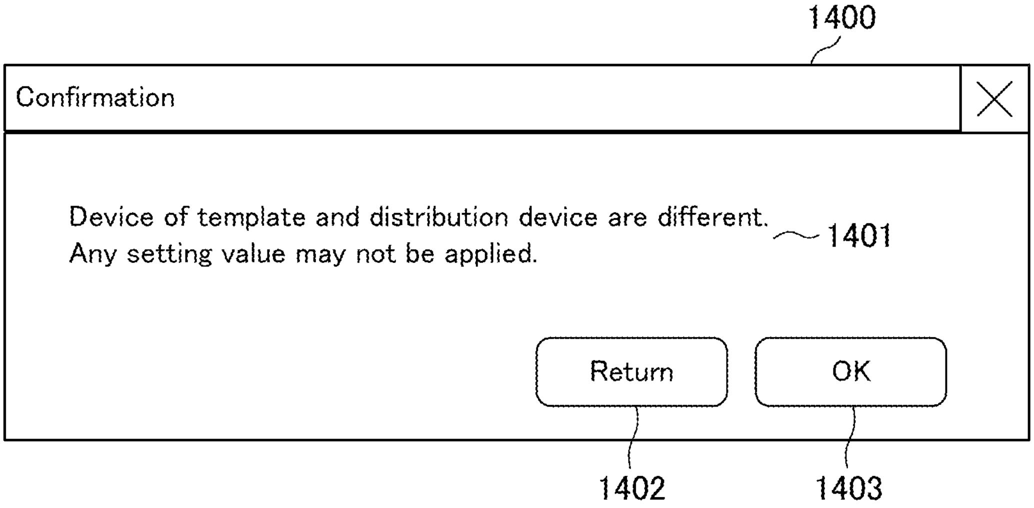
FIG. 14 is a view illustrating an example of warning display.

An example of the warning display will be described with reference to FIG. 14. FIG. 14 is a view illustrating an example of warning display. On a warning display screen 1400, a message display region 1401, a return button 1402, and an OK button 1403 are displayed. In the message display region 1401, for example, a message indicating that the device of the template and the distribution device are different is displayed. In addition, a message indicating that the device models are different and a setting value may not be applied may be displayed. The warning display screen 1400 may be a pop-up that is superimposed and displayed on the distribution device selection screen 1300 or may be a screen that is displayed next to the distribution device selection screen 1300. If the return button 1402 is pressed, the device management server 1000 returns to the processing of S1003 and displays the distribution device selection screen 1300. On the other hand, if the OK button 1403 is pressed, the device management server 1000 performs the processing of S1005.

If the device models of the template and the distribution device are identical or if the user who receives the warning display indicating that the device models of the template and the distribution device are different performs selection of advancing the process, the processing of S1005 is performed. In S1005, the device setting distribution unit 331 determines whether or not a distribution setting set in S1002 is schedule distribution. If the distribution setting is the schedule distribution, processing of S1007 and S1008 is performed. On the other hand, if the distribution setting is not the schedule distribution, that is, if the distribution setting is immediate distribution, processing of S1006 is performed.

First, a process when the immediate distribution is selected will be described. In S1006, the device setting distribution unit 331 performs a process of immediately distributing the setting values based on the template selected in S1001 to the device selected in S1003. If the device models of the template and the distribution device are identical, the device setting distribution unit 331 distributes the setting values of all setting items set in the template. On the other hand, if the device models of the template and the distribution device are different, the device setting distribution unit 331 distributes only the setting values of the setting items supported by the distribution device among the setting items set in the template. For example, it is assumed that the template 3 is selected in S1001, and as the settings of the template 3, "printing setting 3" is "on" and "device operation setting 1" is "on". It is assumed that Device 2 with the product name (device model) of MFP4 is selected as the distribution device in S1004, and MFP4 supports "printing setting 3" but does not support "device operation setting 1". In this case, the setting that "printing setting 3" supported by MFP4 is "on" is distributed to Device 2. A distribution confirmation screen for confirming distribution contents may be displayed between S1005 and S1006, and only if the user instructs distribution on the distribution confirmation screen, the device setting distribution unit 331 may perform distribution. Even for the immediate distribution, a task of a schedule to be immediately executed may be created and stored, and the device setting distribution unit 331 may perform setting distribution based on the task.

Next, a process when the schedule distribution is selected will be described. In S1007, the function display unit 303 receives a setting of date and time when firmware is distributed. Specifically, the function display unit 303 performs UI display for prompting an input of date and time of schedule distribution and receives an input of distribution date and time by the user. In S1008, the schedule management unit 321 creates and stores a task of setting value distribution. The schedule management unit 321 creates a distribution task based on the template selected in S1001, the distribution device selected in S1004, and information of date and time input in S1006. Then, the schedule management unit 321 stores the created distribution task in the schedule storage unit 322. In the distribution task, the distribution device, settings (combinations of setting items and setting values) set using the template, and information of distribution date and time are included. Because the settings of the template are stored in the distribution task, if the device model intended by the template and the device model of the distribution device are different, a setting not supported by the distribution device is likely to be included in the distribution task by way of a warning screen. That is, only if the user confirms the warning screen and understands, the setting not supported by the distribution device can be included in the distribution task. Information regarding the template used in the creation of the task may be included in the distribution task. In a distribution process based on the distribution task, similarly to the immediate distribution, only the setting supported by the distribution device in the setting of the template is distributed, and an unsupported setting is not distributed. A distribution confirmation screen for confirming the contents of the distribution task may be displayed between S1007 and S1008, and only if the user instructs distribution on the distribution confirmation screen, the schedule management unit 321 may perform a process of storing the task.

As described above, according to the present embodiment, if the device model of the template is different from that of the distribution device, the user can preliminarily notice the device model of the template is different from that of the distribution device, by the warning. For this reason, the user can return and select a template or a distribution device again as needed. With this, convenience of creation of a setting distribution task using a template can be improved.

Second Embodiment

In the first embodiment, even if the device model of the template is different from that of the distribution device, after the confirmation of the warning screen, the immediate distribution and the creation of the distribution task when the device model of the template is different from that of the distribution device are allowed. In a second embodiment, if the device model of the template is different from that of the distribution device, the immediate distribution and the storage of the distribution task are disabled. For this reason, in the present embodiment, if the device model of the template is different from that of the distribution device, reselection of a distribution device or reselection of a template is prompted, and transition to a previous screen cannot be made until the device model of the template is identical to that of the distribution device.

A creation process of a setting distribution task in the second embodiment will be described with reference to FIGS. 10, 11A, and 15. A flow of the creation process of the setting distribution task in the present embodiment is the same as in the first embodiment, excluding details of the processing of S1004. Hereinafter, only differences from the first embodiment will be described. The same configurations and processes as those in the first embodiment are represented by the same reference numerals, and description thereof will not be repeated. The creation process of the setting distribution task is realized by the CPU 10 of the device management server 1000 executing the program stored in the memory (the ROM 11 or the HDD 19).

In the second embodiment, S1001 to S1003 are the same as in the first embodiment. In S1003, the process illustrated in FIG. 11A is performed. In S1004, the function display unit 303 and the device setting distribution unit 331 determine whether or not to perform a warning based on the distribution device, and perform a process of displaying a warning if determination is made to perform a warning. If the warning is displayed, that is, if the device model of the template is not identical to that of the distribution device, the device setting distribution unit 331 does not proceed to the processing of S1005.

Details of the processing of S1004 in the second embodiment will be described with reference to FIG. 15. FIG. 15 is a flowchart illustrating a warning process in the second embodiment. In S1501, the function display unit 303 acquires information of the distribution device selected in the device list 1301 of the distribution device selection screen 1300. In the example illustrated in FIG. 13, "Device 2" with the product name of "MFP4" is selected as the distribution device.

In S1502, the device setting distribution unit 331 determines whether or not the device model of the template selected in S1001 is identical to that of the distribution device. The device model corresponds to the product name. For example, while the template 3 selected in S1001 is created to have the device model of "MFP1", the distribution device selected in S1003 has the product name of "MFP4", and the device setting distribution unit 331 determines that the device models are not identical. If the device model of the template is identical to that of the distribution device, the process returns to the flowchart of FIG. 10, and the processing of S1005 is performed. That is, if the device model of the template is identical to that of the distribution device, the warning display is not performed. On the other hand, if the device model of the template is not identical to that of the distribution device, processing of S1503 is performed.

In S1503, the function display unit 303 performs the warning display. With the present processing, if the device model of the template created preliminarily is different from that of the distribution device, the warning display can be performed, and the user can notice that the device model of the template is different from that of the distribution device, by the warning before creating a task. Then, the user can return and select a template or a distribution device again as needed.

Figure 16:
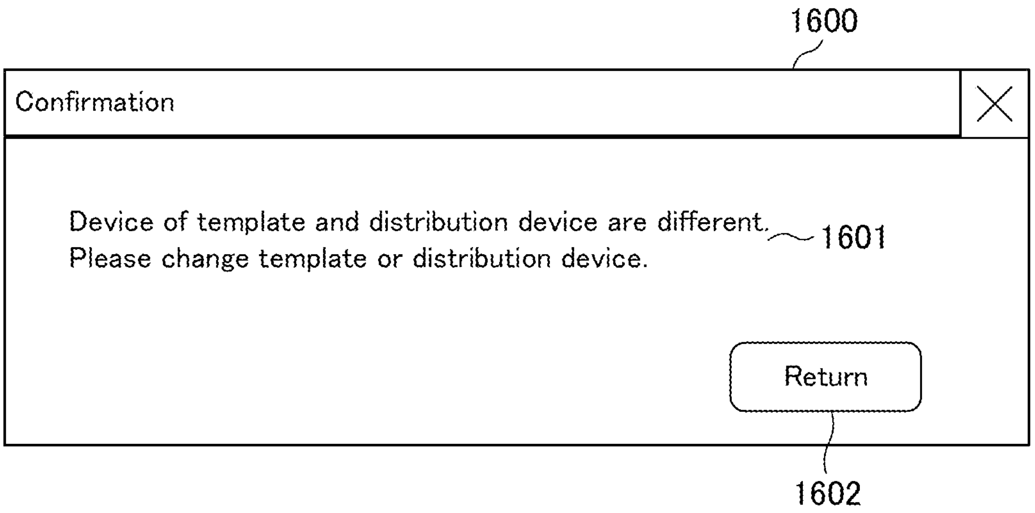
FIG. 16 is a view illustrating an example of warning display in the second embodiment.

An example of the warning display in the second embodiment will be described with reference to FIG. 16. FIG. 16 is a view illustrating an example of warning display in the second embodiment. On a warning display screen 1600, a message display region 1601 and a return button 1602 are displayed. In the message display region 1601, a message indicating that the device of the template is different from the distribution device is displayed, and a message for prompting the user to change the template or the distribution device is displayed. The warning display screen 1600 may be a pop-up that is superimposed and displayed on the distribution device selection screen 1300 or may be a screen that is displayed next to the distribution device selection screen 1300. If the return button 1602 is pressed, the device management server 1000 returns to the processing of S1003 and displays the distribution device selection screen 1300. Instead of the return button 1602 for returning to the distribution device selection screen 1300, a button for returning to the template selection screen 600 to change the template may be displayed. Both a button for returning to the distribution device selection screen 1300 and a button for returning to the template selection screen 600 may be displayed. Then, on the warning display screen 1600, a button for advancing the process, for example, a button corresponding to the OK button 1403 on the warning display screen 1400 of the first embodiment is not displayed. That is, on the warning display screen 1600, a button (a button other than the return button) for transition to a screen other than the distribution device selection screen 1300 or the template selection screen 600 is not displayed. The process is not advanced as long as the warning display screen 1600 is displayed. Therefore, in the second embodiment, a configuration is made in which the distribution task cannot be created or the immediate distribution cannot be executed in a state in which the device model of the template is different from that of the distribution device.

With the processing of S1004 in the second embodiment, the process after S1005 is not executed only if the device model of the template matches the device model of the distribution device. In the distribution of the device settings of the present embodiment, if the device model of the template created preliminarily is different from that of the distribution device, a warning is displayed to prohibit distribution, and only if the device model of the template matches the device model of the distribution device, the settings can be distributed.

As described above, according to the present embodiment, if the device model of the template is different from that of the distribution device, the warning is displayed. On the displayed screen of the warning, only the return button to the screen for changing the template or the distribution device is displayed as a button for screen transition. Therefore, if the device model of the template is different from that of the distribution device, the storage of the task is disabled. With this, the distribution task can be stored only if the device model of the template is identical to that of the distribution device, and creation of a distribution task including a setting incapable of being distributed can be suppressed.

Third Embodiment

In the first embodiment, in selecting the distribution device, all devices as a management target are displayed as selection candidates of the distribution device. However, among the selection candidates of the distribution device, a device having a device model not matching the device model of the selected template is also included. Accordingly, in the present embodiment, displaying only a device having a device model identical to the device model of the selected template as a selection candidate of the distribution device is allowed, and a distribution device having a device model matching the device model of the template is made to be easily selected.

Figure 17:
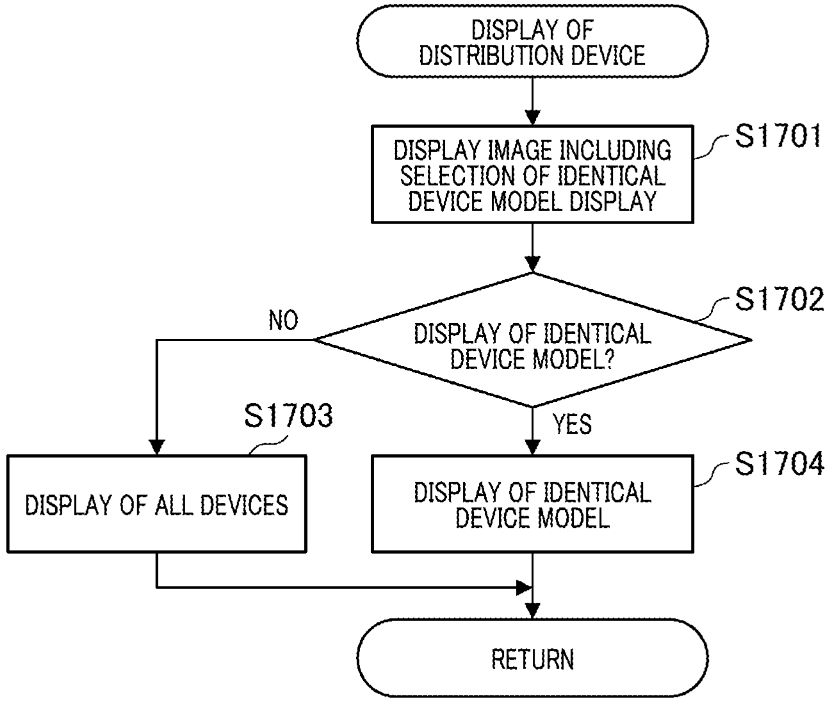
FIG. 17 is a flowchart illustrating a display process of a distribution device selection screen in a third embodiment.

A creation process of a setting distribution task in the third embodiment will be described with reference to FIGS. 10 and 17. A flow of the creation process of the setting distribution task in the present embodiment is the same as in the first embodiment, excluding details of the processing of S1003. Hereinafter, only differences from the first embodiment will be described. The same configurations and processes as those in the first embodiment are represented by the same reference numerals, and description thereof will not be repeated. The creation process of the setting distribution task is realized by the CPU 10 of the device management server 1000 executing the program stored in the memory (the ROM 11 or the HDD 19).

Figure 18:
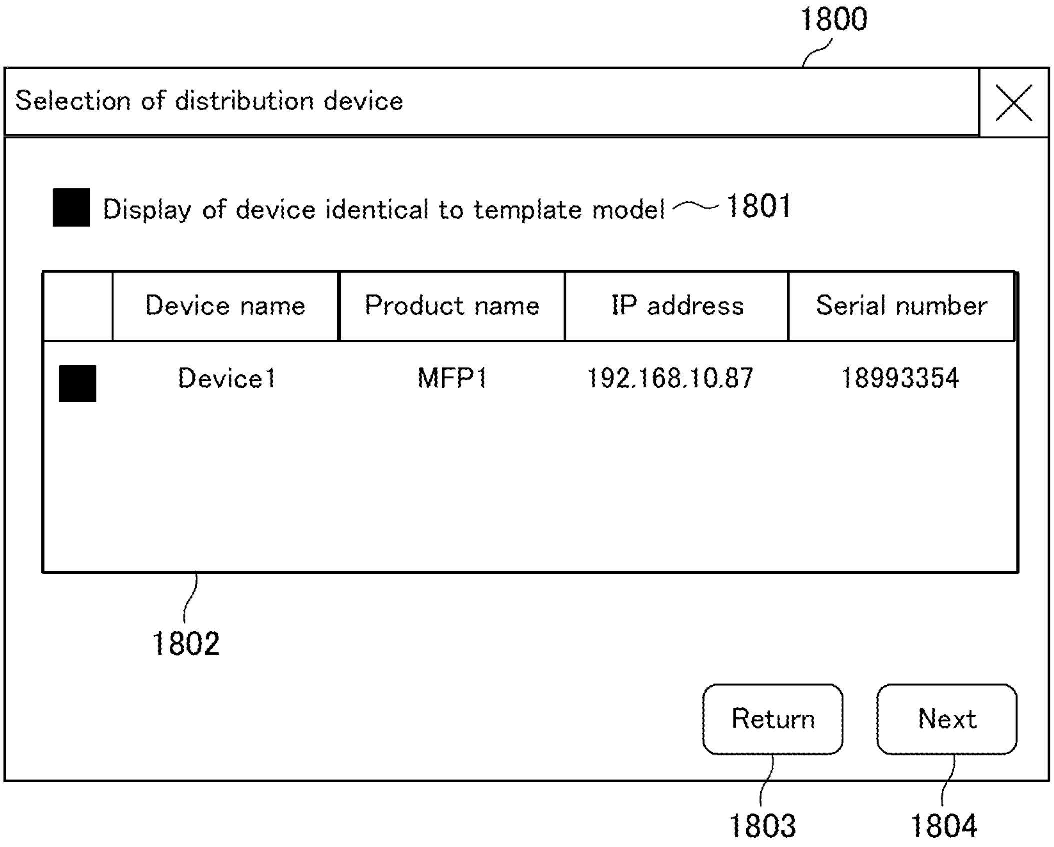
FIG. 18 is a view illustrating an example of the distribution device selection screen in the third embodiment.

In the third embodiment, S1001 and S1002 are the same as in the first embodiment. In S1003, a process illustrated in FIG. 17 is performed. FIG. 17 is a flowchart illustrating a display process of a distribution device selection screen in the third embodiment. In S1701, the function display unit 303 displays a distribution device selection screen including selection of identical device model display. FIG. 18 is a view illustrating an example of the distribution device selection screen in the third embodiment. On a distribution device selection screen 1800 displayed in the third embodiment, as devices that are displayed in a device list 1802, all found devices or a device with a device model identical to the device model of the template can be selected. In the example illustrated in FIG. 18, a checkbox 1801 for displaying a device with a device model identical to the device model of the template is displayed, and if the checkbox 1801 is selected, the device of the device model identical to the device model of the template is displayed in the device list 1802. For example, if the template selected in S1001 is the template 3, and the device model corresponding to the template 3 is MFP1, only Device 1 with MFP1 among Device 1 to Device 3 is displayed in the device list 1802. On the other hand, if the checkbox 1801 is not selected, all found devices are displayed in the device list 1802. The display of the device list 1802 when all found devices are displayed is the same as the device list 1301 illustrated in FIG. 13. As long as the user can switch the device displayed in the device list 1802 between all devices and the device of the device model matching the device model of the template, a display method is not limited. A return button 1803 and a next button 1804 of the distribution device selection screen 1800 have the same functions as the return button 1302 and the next button 1303 of the distribution device selection screen 1300. The device list 1802 of the distribution device selection screen 1800 displayed in S1701 may be displayed in a state in which the checkbox 1801 is selected or may be displayed in a state in which the checkbox 1801 is not selected.

In S1702, the function display unit 303 determines whether or not display of the device of the device model identical to the template model is selected. The function display unit 303 determines whether or not the display of the device of the device model identical to the template model is selected according to whether or not the checkbox 1801 is selected. If the checkbox 1801 is selected, that is, if the display of the device of the device model identical to the template model is selected, processing of S1704 is performed. On the other hand, if the checkbox 1801 is not selected, that is, if the display of the device of the device model identical to the template model is selected, processing of S1703 is performed.

In S1703, the function display unit 303 performs a process of displaying all devices found already on the distribution device selection screen 1800. In S1704, the function display unit 303 displays only the device of the device model identical to the device model of the template on the distribution device selection screen 1800. The function display unit 303 compares the device model of the template with the devices of the device list in which all found devices are collected, and displays identical devices in the device list 1802. For example, if the devices in the device list are Device 1 to Device 3, only the device 1 with MFP1 identical to the device model of the template is displayed.

When the checkbox 1801 is selected and the identical device model display is selected in S1701, the function display unit 303 displays only the devices with the device model matching the device model of the template in the device list 1802. When a distribution device is selected from among the displayed devices with the device model matching the device model of the template, the warning display is not performed in the processing of S1004, and the immediate distribution or the process of creating the task of the schedule can be advanced. The processing of S1004 in the third embodiment may be the same processing as in the first embodiment (FIG. 11B) or may be the same processing as in the second embodiment (FIG. 15). The process after S1005 in the third embodiment is the same as in the first embodiment. In the present embodiment, although an example where only the devices with the device model matching the device model of the template are displayed as a selection target for a distribution device and devices with different device models are not displayed has been described, the present invention is not limited thereto. For example, on the distribution device selection screen, devices with a device model different from the device model of the template may be displayed in a non-selectable state. That is, only the devices with the device model with the device model of the template may be displayed in a selectable state on the distribution device selection screen. In the present embodiment, although an example where the user switches the display of the selection target device in the device list 1802 with the selection of the checkbox 1801 has been described, the present invention is not limited thereto. For example, the checkbox 1801 may not be displayed on the distribution device selection screen 1800, and if the template is selected, the function display unit 303 may display only the devices with the device model identical to the template model.

As described above, according to the present embodiment, in the display of the distribution device, only the device with the device model identical to the device model of the template can be displayed, and the device with the device model identical to the device model of the template can be selected. With this, the settings based on the template can be distributed to the device that supports the settings of the template.

Fourth Embodiment

In the first embodiment and the second embodiment, on the distribution device selection screen, all devices as a management target are displayed. In the third embodiment, on the distribution device selection screen, the display of all devices as a management target and the display of only the device with the device model identical to the device model of the template may be switched. In a fourth embodiment, an example where a device with a device model identical to and a device with a device model different from the device model of the template are displayed in an identifiable manner on a distribution device selection screen.

Figure 19:
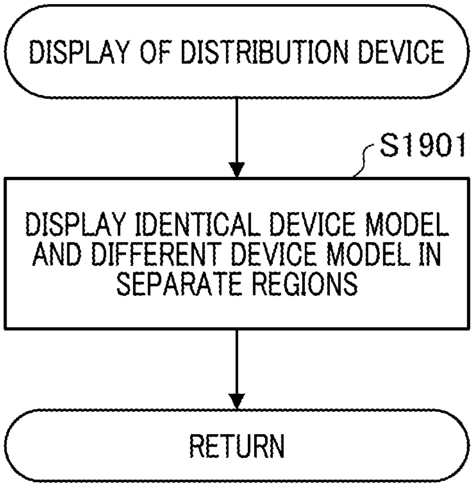
FIG. 19 is a flowchart illustrating a display process of a distribution device selection screen in a fourth embodiment.

A creation process of a setting distribution task in the fourth embodiment will be described with reference to FIGS. 10 and 19. A flow of the creation process of the setting distribution task in the present embodiment is the same as in the first embodiment, excluding details of the processing of S1003. Hereinafter, only differences from the first embodiment will be described. The same configurations and processes as those in the first embodiment are represented by the same reference numerals, and description thereof will not be repeated. The creation process of the setting distribution task is realized by the CPU 10 of the device management server 1000 executing the program stored in the memory (the ROM 11 or the HDD 19).

In the fourth embodiment, S1001 and S1002 are the same as in the first embodiment. In S1003, a process illustrated in FIG. 19 is performed. FIG. 19 is a flowchart illustrating a display process of a distribution device selection screen in the fourth embodiment. In S1701, the function display unit 303 displays a distribution device selection screen on which a device with a device model identical to and a device with a device model different from the device model of the template are displayed in a distinctive manner. An example of the distribution device selection screen on which devices are displayed in a distinctive manner to allow the user to identify a device with a device model identical to and a device with a device model different from the device model of the template is illustrated in FIG. 20.

Figure 20:
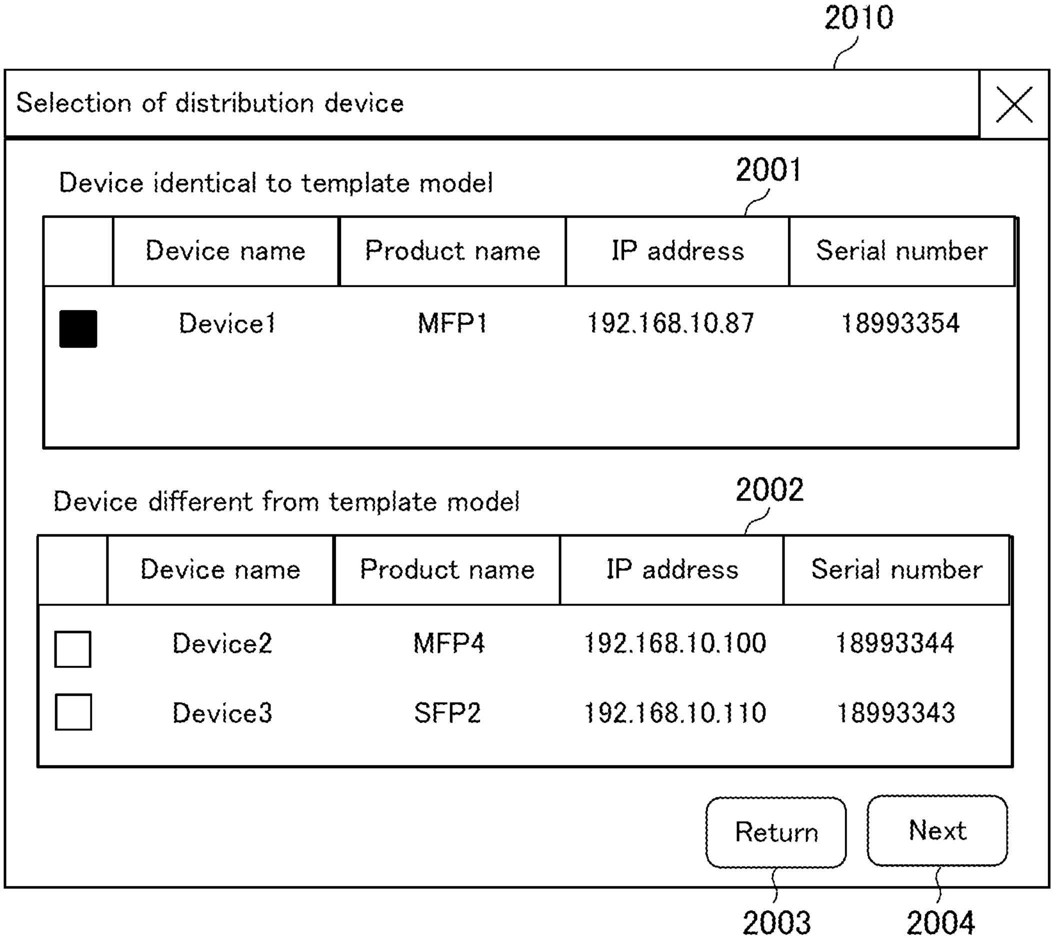
FIG. 20 is a view illustrating an example of the distribution device selection screen in the fourth embodiment.

FIG. 20 is a view illustrating an example of a distribution device selection screen in the fourth embodiment. On a distribution device selection screen 2010, an identical device display region 2001 as a first region and a different device display region 2002 as a second region are provided. The function display unit 303 compares the devices in the device list with the template model and displays devices with a device model identical to the device model of the template in the identical device display region 2001. On the other hand, the function display unit 303 compares the devices in the device list with the template model and displays devices with a device model different from the device model of the template in the different device display region 2002. That is, the function display unit 303 displays, in the different device display region 2002, devices not displayed in the identical device display region 2001 among all devices in the device list. For example, if the device model of the template is MFP1, "Device 1" with the device model of "MFP1" is displayed in the identical device display region 2001. On the other hand, "Device 2" with "MFP4" and "Device 3" with "SFP2" are displayed in the different device display region 2002. A return button 2003 and a next button 2004 of the distribution device selection screen 2010 have the same functions as the return button 1302 and the next button 1303 of the distribution device selection screen 1300.

Figure 15:
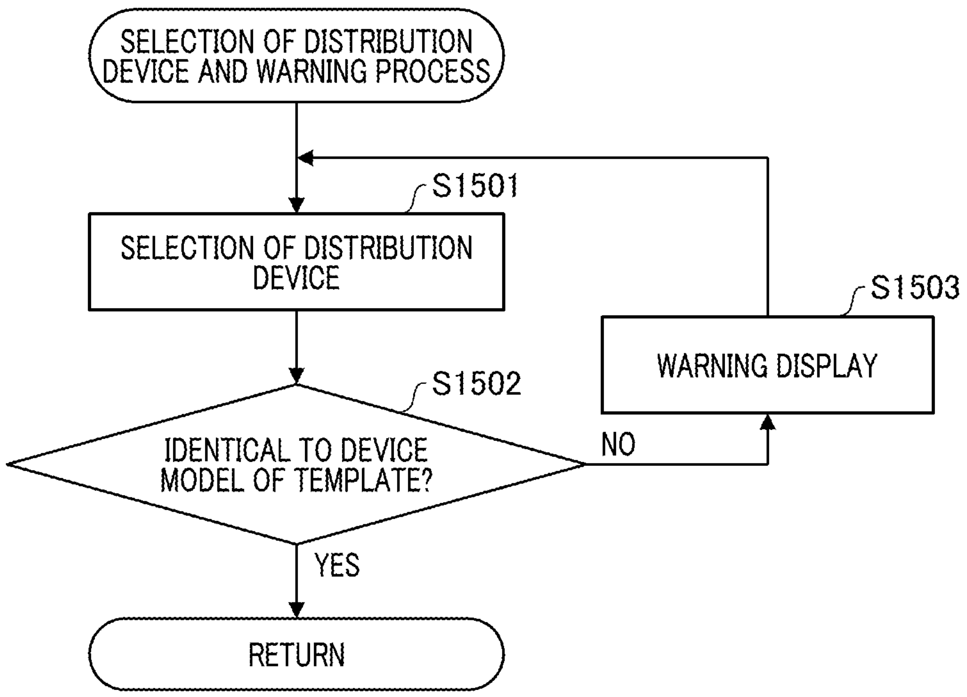
FIG. 15 is a view illustrating a warning process in a second embodiment.

The processing of S1004 in the fourth embodiment may be the same processing as in the first embodiment (FIG. 11B) or may be the same processing as in the second embodiment (FIG. 15). The process after S1005 in the fourth embodiment is the same as in the first embodiment.

In the display of the distribution device, "Device 1" as the device with the device model identical to the device model of the template and "Device 2" and "Device 3" as the device with the device model different from the device model of the template can be displayed in a distinctive manner. With this, the user can select a distribution device after recognizing the difference from the device model of the template. According to the present embodiment, in the display of the distribution device, the device with the device model identical to and the device with the device model different from the device model of the template can be displayed in separate regions. With this, the user can select a device after recognizing the difference from the device model of the template.

Fifth Embodiment

In the first embodiment and the second embodiment, only the message indicating that the device model of the distribution device is different from the device model of the template is displayed in the warning display. The user cannot confirm a setting that is not applied since the devices are different, only with the display contents. Accordingly, in the present embodiment, an unsupported setting is displayed in the warning display, in addition to the message indicating that the devices are different.

Figure 21:
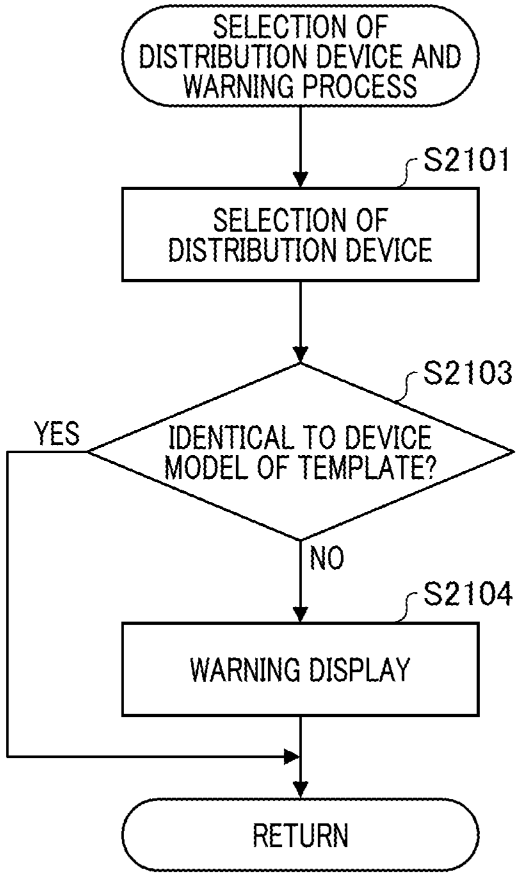
FIG. 21 is a flowchart illustrating a warning process in a fifth embodiment.

A creation process of a setting distribution task in the fifth embodiment will be described with reference to FIGS. 10 and 21. A flow of the creation process of the setting distribution task in the present embodiment is the same as in the first embodiment, excluding details of the processing of S1004. Hereinafter, only differences from the first embodiment will be described. The same configurations and processes as those in the first embodiment are represented by the same reference numerals, and description thereof will not be repeated. The creation process of the setting distribution task is realized by the CPU 10 of the device management server 1000 executing the program stored in the memory (the ROM 11 or the HDD 19).

In the fifth embodiment, S1001 to S1003 are the same as in the first embodiment. In S1003, the processing illustrated in FIG. 11A is performed. In S1003, the same processing as in the third embodiment or the fourth embodiment may be performed. In S1004, the function display unit 303 and the device setting distribution unit 331 determine whether or not to perform a warning based on the device model of the template and the distribution device, and perform a process of displaying a warning if determination is made to perform a warning. Then, in the present embodiment, when a warning is displayed in S1004, a setting of the template not applied to the distribution device since the device model of the template is different from that of the distribution device is also displayed.

Details of the processing of S1004 in the fifth embodiment will be described with reference to FIG. 21. FIG. 21 is a flowchart illustrating a warning process in the fifth embodiment. In S2101, the function display unit 303 acquires information of the distribution device selected in the device list 1301 of the distribution device selection screen 1300. In the example illustrated in FIG. 13, "Device 2" with the product name of "MFP4" is selected as the distribution device.

In S2102, the device setting distribution unit 331 determines whether or not the device model of the template selected in S1001 is identical to that of the distribution device. The device model corresponds to the product name, and the device setting distribution unit 331 compares the device model of the template with the product name of the distribution device. For example, while the template 3 selected in S1001 is created to have the device model of "MFP1", the distribution device selected in S1003 has the product name of "MFP4", and the device setting distribution unit 331 determines that the device models are not identical. If the device model of the template is identical to that of the distribution device, the process returns to the flowchart of FIG. 10, and the processing of S1005 is performed. That is, if the device model of the template is identical to that of the distribution device, the warning display is not performed. On the other hand, if the device model of the template is not identical to that of the distribution device, processing of S2104 is performed.

In S2104, the function display unit 303 performs warning display. With the present processing, if the device model of the template created preliminarily is different from that of the distribution device, the warning display can be performed, and the user can notice that the device model of the template is different from that of the distribution device, by the warning before creating a task. Then, the user can return and select a template or a distribution device again as needed.

Figure 22:
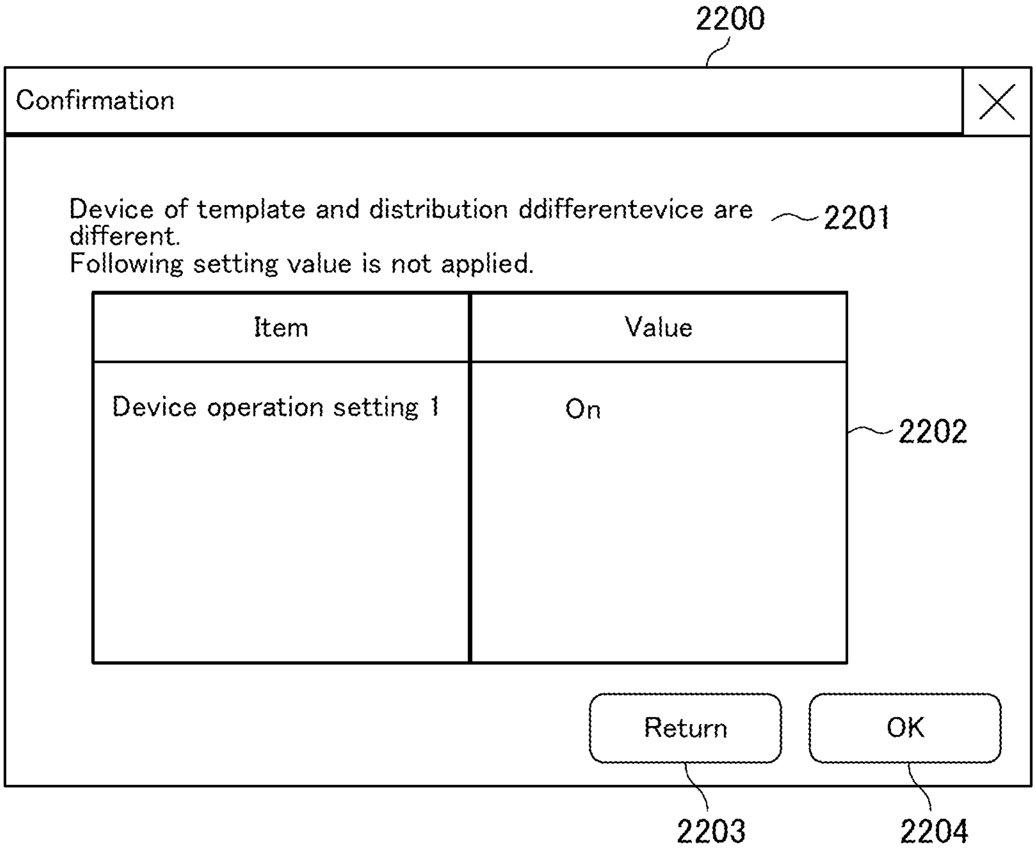
FIG. 22 is a view illustrating an example of warning display in the fifth embodiment.

An example of the warning display in the fifth embodiment will be described with reference to FIG. 22. FIG. 22 is a view illustrating an example of warning display in the fifth embodiment. On a warning display screen 2200, a message display region 2201, an unsupported setting list 2202, a return button 2203, and an OK button 2204 are displayed. In the message display region 2201, a message indicating that the device of the template and the distribution device are different is displayed. In the unsupported setting list 2202, a setting (setting items and setting values) that is not supported by the distribution device and not distributed, that is, a setting not applied to the distribution device, among the settings of the template is displayed. The setting that is not distributed can be specified by comparing a setting that can be applied to the devices managed by the device data management unit 312, with the settings of the template. For example, it is assumed that the template 3 is selected as the template, and "Device 2" is selected as the distribution device. The template 3 is created to have the device model of "MFP1" and has settings of "printing setting 3" and "device operation setting 1". "Device 2" has the product name of "MFP4", and supports "printing setting 3" but does not support "device operation setting 1". In this case, in the unsupported setting list 2202, the setting item "device operation setting 1" and the setting value "on" are displayed. The user can confirm a setting that cannot be applied to the distribution device, among the settings of the template immediately after the selection of the distribution device by confirming the unsupported setting list 2202. In the present embodiment, although an example where only the setting that is not applied to the distribution device is displayed has been described, the present invention is not limited thereto, and in addition to a list of settings not applied, a list of settings applied to the distribution device may also be displayed. If the return button 2203 is pressed, the device management server 1000 returns to the processing of S1003 and displays the distribution device selection screen 1300. On the other hand, if the OK button 2204 is pressed, the device management server 1000 performs the processing of S1005. The process after S1005 is the same as in the first embodiment.

According to the present embodiment, if the device model of the template created preliminarily and the device to which the settings are to be distributed are different, in addition to the warning, displaying the setting not supported by the device is allowed. With this, the user can confirm whether or not desired settings are distributed, before task creation of a task or before distribution, and can return and select a template or a distribution device again as needed.

Sixth Embodiment

In a sixth embodiment, when a plurality of devices are selected as a distribution device, a process of distributing only a common setting of the devices will be described. A creation process of a setting distribution task in the sixth embodiment will be described with reference to FIGS. 10, 23, and 24. Hereinafter, only differences from the first embodiment will be described. The same configurations and processes as those in the first embodiment are represented by the same reference numerals, and description thereof will not be repeated. The creation process of the setting distribution task is realized by the CPU 10 of the device management server 1000 executing the program stored in the memory (the ROM 11 or the HDD 19).

Figure 23:
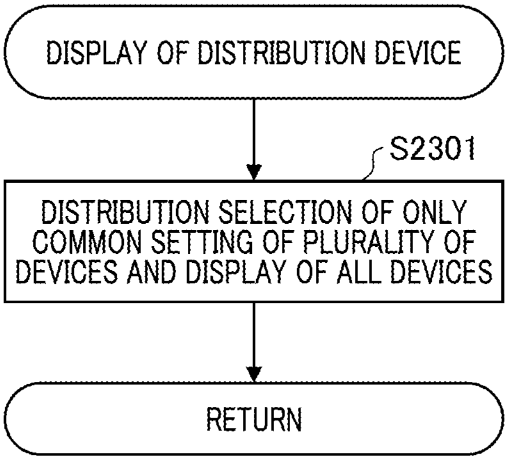
FIG. 23 is a flowchart illustrating a display process of a distribution device selection screen in a sixth embodiment.

In the sixth embodiment, S1001 to S1002 are the same as in the first embodiment. In S1003, a process illustrated in FIG. 23 is performed. In S1003, the function display unit 303 performs UI display for prompting selection of devices (distribution device) to which the settings are to be distributed. Details of the processing of S1003 in the present embodiment will be described with reference to FIG. 23.

Figure 25A:
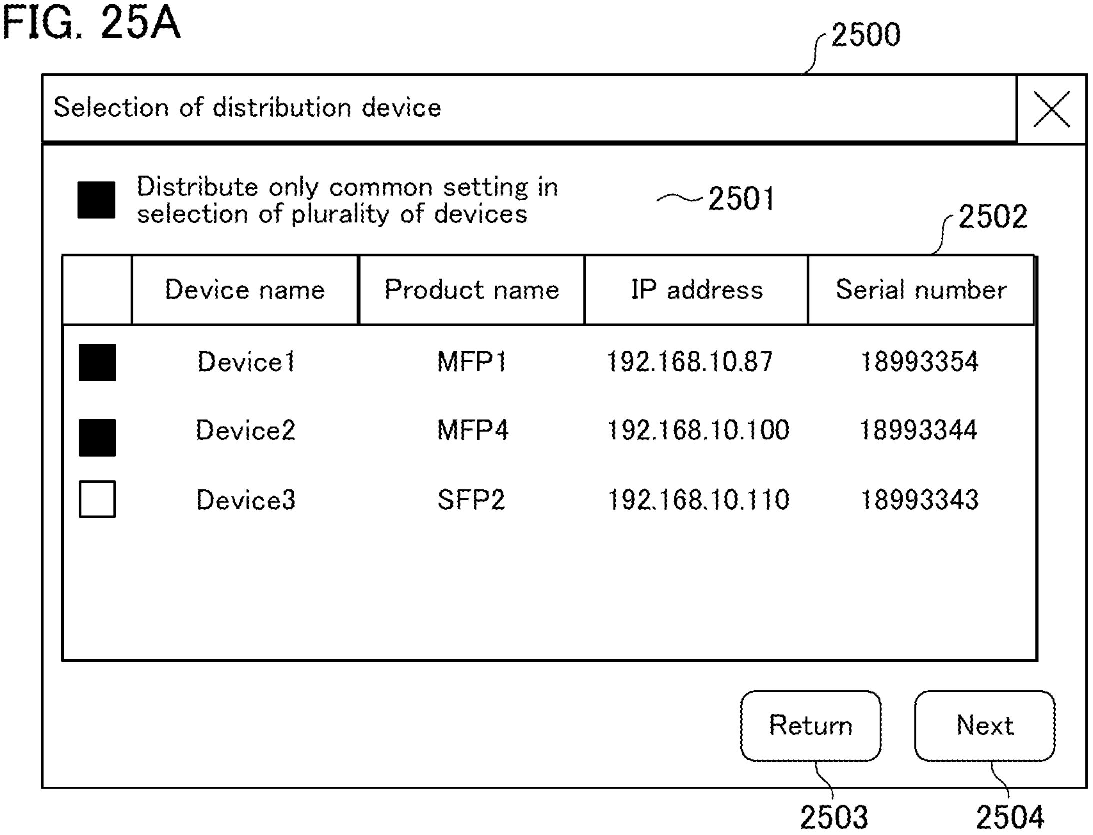
FIGS. 25A and 25B are views illustrating an example of a distribution device selection screen and a warning screen in the sixth embodiment.

FIG. 23 is a flowchart illustrating a display process of a distribution device selection screen in the sixth embodiment. In S2301, the function display unit 303 displays a distribution device selection screen including selection of identical device model display. FIG. 25A is a view illustrating an example of a distribution device selection screen in the sixth embodiment. On a distribution device selection screen 2500 displayed in the sixth embodiment, a common setting distribution checkbox 2501, a device list 2502, a return button 2503, and a next button 2504 are displayed. The common setting distribution checkbox 2501 is a checkbox for selecting whether or not to distribute only a common setting when a plurality of devices are selected as a distribution device. In the device list 2502, all found devices are displayed. The user can select one or more devices in the device list 2502. In the example illustrated in FIG. 25A, "Device 1" with the product name of "MFP1" and "Device 2" with the product name of "MFP4" are selected as a distribution device, and the common setting distribution checkbox 2501 is selected. In this case, only a common setting to the "Device 1" and "Device 2" is to be distributed. The return button 2503 and the next button 2504 of the distribution device selection screen 2500 have the same functions as the return button 1302 and the next button 1303 of the distribution device selection screen 1300. If the next button 2504 is pressed, the device of the device management server 1000 performs the processing of S1004.

Figure 24:
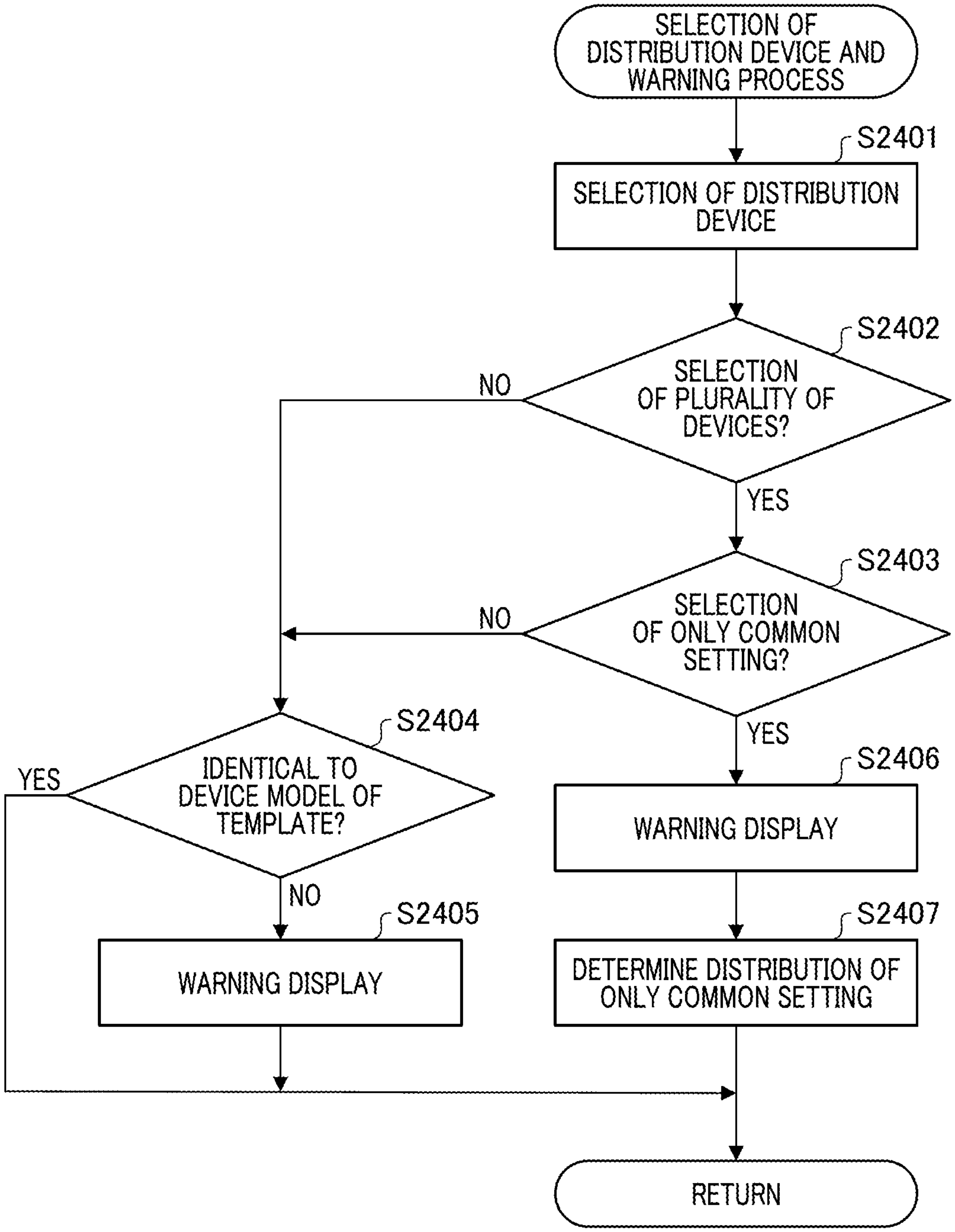
FIG. 24 is a flowchart illustrating a warning process in the sixth embodiment.

Details of the processing of S1004 in the present embodiment will be described with reference to FIG. 24. FIG. 24 is a flowchart illustrating a warning process in the sixth embodiment. In S2401, the function display unit 303 acquires information of the distribution devices selected in the device list 2502 of the distribution device selection screen 2500. In the example illustrated in FIG. 25A, "Device 1" with the product name of "MFP1" and "Device 2" with the product name of "MFP4" are selected as a distribution device.

In S2402, the device setting distribution unit 331 determines whether or not the number of devices selected as a distribution device is plural. If the number of devices selected as a distribution device is plural, the device setting distribution unit 331 performs processing of S2403. On the other hand, if the number of devices selected as a distribution device is not plural, the device setting distribution unit 331 performs processing of S2404.

In S2403, the device setting distribution unit 331 determines whether or not a setting of distributing only a common setting when a plurality of devices are selected is made. Specifically, if the common setting distribution checkbox 2501 of the distribution device selection screen 2500 is checked, the device setting distribution unit 331 determines that the setting of distributing only the common setting is made. If determination is made that the setting of distributing only the common setting is made, the device setting distribution unit 331 performs processing of S2406. On the other hand, if determination is made that the setting of distributing only the common setting is not set, the device setting distribution unit 331 performs processing of S2404.

In S2404, the device setting distribution unit 331 determines whether or not the device model of the template selected in S1001 is identical to that of the distribution device. The processing of S2404 is the same as the processing of S1502 of the first embodiment. If the number of distribution devices is plural, determination is made whether or not each distribution device has a device model identical to the device model of the template for each distribution device. If all distribution devices have the device model identical to the device model of the template, warning display is not performed, and the processing of S1005 is performed. On the other hand, if there is a distribution device with a device model different from the device model of the template, processing of S2405 is performed. In S2405, the function display unit 303 performs warning display. The processing of S2405 is the same as the processing of S1503 of the first embodiment. In S2405, a distribution device with a device model different from the device model of the template may be specified, and information capable of identifying the device may be displayed. The settings not distributed may also be displayed.

Figure 25B:
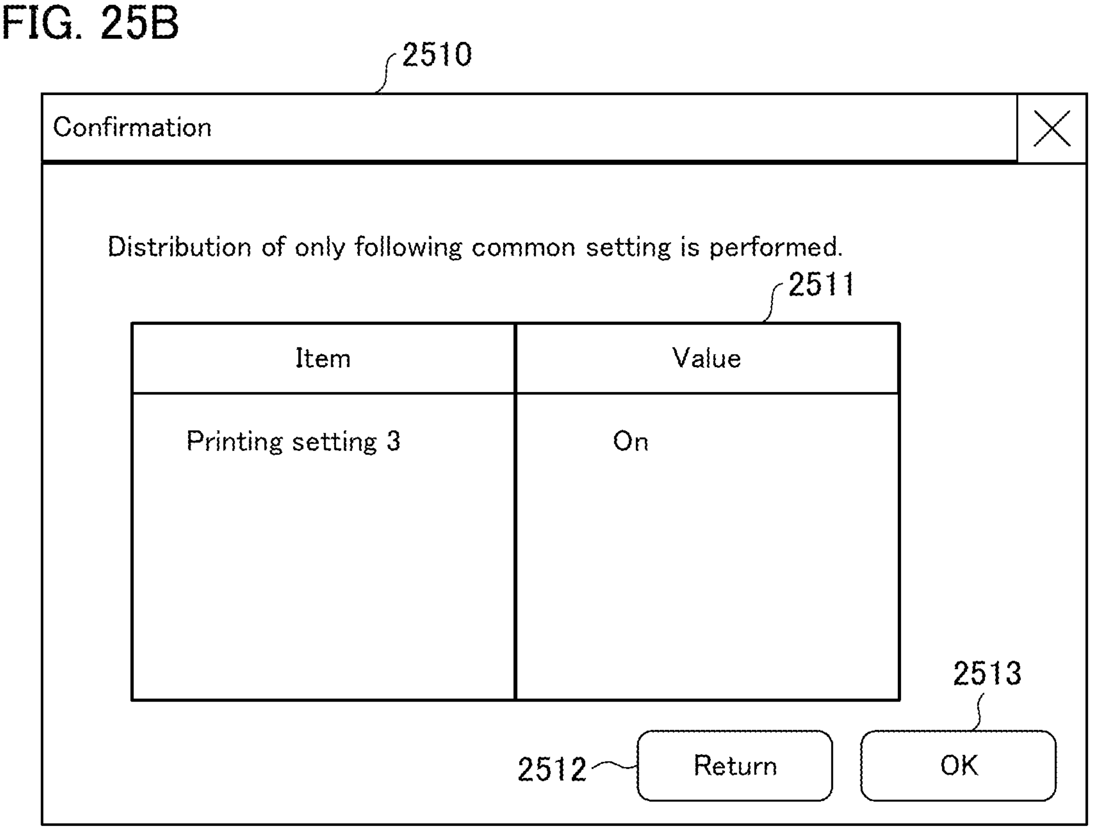

If a plurality of devices are selected as a distribution device, and selection of distributing only the common setting to a plurality of distribution devices is made, the device management server 1000 performs the processing of S2406. In S2406, the function display unit 303 performs warning display indicating that only the common setting is distributed. An example of the warning display displayed in S2406 is illustrated in FIG. 25B. FIG. 25B is a view illustrating an example of warning display in the sixth embodiment. On a warning display screen 2510, for example, a common setting list 2511, a return button 2512, and an OK button 2513 are displayed. In the common setting list 2511, the common setting (setting item and setting value) that is distributed to all of a plurality of devices selected as a distribution device is displayed. That is, a setting supported by all designated distribution devices in the setting of the template is displayed as a common setting in the common setting list 2511. For example, the setting items of the template 3 are "printing setting 3" and "device operation setting 1" as illustrated in FIG. 9. "Device 1" supports "printing setting 3" and "device operation setting 1". On the other hand, "Device 2" supports "printing setting 3" but does not support "device operation setting 1". For this reason, between the settings of the template 3, the common setting of "Device 1" and "Device 2" selected as a distribution device is "printing setting 3", and when only the common setting is distributed, only the setting of "printing setting 3" is distributed. In this case, in the common setting list 2511, the setting item "printing setting 3" and the setting value "on" as the common setting are displayed. If no common setting exists, no setting may be displayed in the common setting list 2511 or a message indicating that no common setting exists may be displayed instead of the common setting list 2511. In the present embodiment, although an example where only the common setting distributed is displayed has been described, the present invention is not limited thereto, and for example, the settings not distributed among the settings of the template may be displayed together. If the return button 2512 is pressed, the function display unit 303 returns to S1003 and displays the distribution device selection screen 2500 as a previous screen. If the OK button 2513 is pressed, processing of S2407 is performed.

In S2407, the device setting distribution unit 331 determines to distribute only the common setting to the distribution devices, and returns to the processing of S1005. For example, if the distribution devices are "Device 1" and "Device 2", the device setting distribution unit 331 determines to distribute the setting of the setting item "printing setting 3" and the setting value "on" as the common setting. When the processing of S2407 is completed, the process returns to the processing of S1005.

S1005 to S1008 are the same as in the first embodiment. In S1005, the device setting distribution unit 331 determines whether or not the distribution setting set in S1002 is the schedule distribution. If the distribution setting is the schedule distribution, the processing of S1007 and S1008 is performed. On the other hand, if the distribution setting is not the schedule distribution, that is, if the distribution setting is the immediate distribution, the processing of S1006 is performed.

In S1006, the device setting distribution unit 331 performs a process of immediately distributing the setting value based on the template selected in S1001 to the devices selected in S1003. If a plurality of devices are selected as a distribution device and distribution of only the common setting is designated by the user on the distribution device selection screen 2500, the device setting distribution unit 331 determines to distribute only the common setting to the distribution devices in S2407. If the device setting distribution unit 331 determines to distribute only the common setting to the distribution devices, the device setting distribution unit 331 distributes only the common setting to a plurality of distribution devices based on the template. For example, if only the common setting is distributed to the distribution devices, the device setting distribution unit 331 immediately distributes the setting of the setting item "printing setting 3" and the setting value "on" as the common setting to "Device 1" and "Device 2". On the other hand, if a plurality of devices are selected as a distribution device and distribution of only the common setting is designated by the user on the distribution device selection screen 2500, the device setting distribution unit 331 performs distribution to each distribution device based on the template. That is, if the distribution of only the common setting to the distribution device is not determined, the device setting distribution unit 331 determines a supported setting among the settings of the template for each distribution device and distributes the setting to each distribution device. For example, the device setting distribution unit 331 immediately distributes the settings of "printing setting 3" and "device operation setting 1" to "Device 1" and the setting of "printing setting 3" to "Device 2".

In S1007, the function display unit 303 receives a setting of date and time when firmware is distributed. In S1008, the schedule management unit 321 creates and stores a task of setting value distribution. In the present embodiment, the schedule management unit 321 creates a distribution task based on the template selected in S1001, the distribution devices selected in S1004, selection of whether or not to distribute only the common setting, and information of date and time input in S1006. Then, the schedule management unit 321 stores the created distribution task in the schedule storage unit 322. If a plurality of devices are selected as a distribution device and the distribution of only the common setting is designated on the distribution device selection screen 2500, the schedule management unit 321 creates a distribution task to distribute only the common setting to a plurality of distribution devices based on the template. That is, if the device setting distribution unit 331 determines to distribute only the common setting to the distribution devices in S2407, the schedule management unit 321 creates a distribution task to distribute only the common setting to a plurality of distribution devices based on the template in response to the determination. For example, when only the common setting is distributed to the distribution devices, the schedule management unit 321 creates a distribution task to distribute the setting of the setting item "printing setting 3" and the setting value "on" as the common setting to "Device 1" and "Device 2". On the other hand, if a plurality of devices are selected as a distribution device and the distribution of only the common setting is not designated, the schedule management unit 321 creates a distribution task to perform distribution according to the support of each distribution device based on the template. That is, if the distribution of only the common setting to the distribution devices is not determined, the schedule management unit 321 determines a supported setting among the settings of the template for each distribution device, and creates a distribution task to distribute the setting to each distribution device. For example, the device setting distribution unit 331 creates a distribution task to distribute the settings of "printing setting 3" and "device operation setting 1" to "Device 1" and the setting of "printing setting 3" to "Device 2".

As described above, according to the present embodiment, the warning display can be performed if the device model of the template created preliminarily is different from that of the distribution device. With the warning display, the user can notice that the device model of the template is different from that of the distribution device, by the warning before task creation, and can return and select a template or a distribution device again as needed. If a plurality of distribution devices are selected, it is possible to select whether or not to distribute only the common setting to the distribution devices. Then, when only the common setting is distributed, the common setting to be distributed is displayed as warning display, so that the user can confirm the distribution contents before task creation and can return and select a template or a distribution device again as needed.

Other Embodiments

The present invention may be applied to a system that includes a plurality of devices (for example, a host computer, an interface device, a reader, and a printer) or an apparatus (for example, a copying machine or a facsimile machine) that includes one device. The present invention is also achieved by supplying a storage medium storing program codes for realizing the functions of the above-described embodiments to the system or the apparatus, and reading and executing the program codes stored in the storage medium by a computer of the system or the apparatus. In this case, the program codes themselves read out from the storage medium realize the functions of the above-described embodiments, and the program codes themselves and the storage medium storing the program codes are within the present invention.

The present invention also includes a case where an operating system (OS) or the like running on a computer performs some or all parts of actual processing based on instructions of program codes, thereby realizing the functions of the above-described embodiments. The present invention is also applied to a case where program codes read out from a storage medium are written in a memory included in a function expansion card inserted into the computer or a function expansion unit connected to the computer. In this case, a CPU included in the function expansion card or the function expansion unit performs some or all parts of actual processing based on the written program codes, thereby realizing the functions of the above-described embodiments.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-080313, filed May 15, 2023, which is hereby incorporated by reference herein in its entirety.

What is claimed is:

1. A management apparatus that manages network devices, the management apparatus comprising:

at least one memory storing instructions; and at least one processor executing the instructions causing the management apparatus to:

manage a template for distributing settings to a network device, wherein the template includes information identifying a device model of the network device;

receive, during creation of a task, a user selection of the template;

receive, during the creation of the task, a user selection of a network device to which the settings are to be distributed;

distribute the settings to the selected network device by executing the task; and display a warning screen before execution of the task when the selected network device does not correspond to the device model identified by the template.

2. The management apparatus according to claim 1, wherein the template includes information of the device model of the network device, and combinations of setting items and setting values, and the warning screen is displayed immediately after the user selection of the template and the user selection of the network device to which the settings are to be distributed are received, when the selected network device does not correspond to the device model identified by the template.

3. The management apparatus according to claim 1, wherein, on the warning screen, a setting of the template not supported by the network device to which the settings are to be distributed is displayed.

4. The management apparatus according to claim 1, wherein, on the warning screen, a return button to a selection screen of a template or a network device to which the settings are to be distributed is displayed along with display for prompting change of the template or the network device to which the settings are to be distributed, and a button for screen transition other than the return button is not displayed, and when the user changes the selection of the template or the selection of the network device to which the settings are to be distributed, and the selected network device corresponds to the device model identified by the template, the created task is allowed to be stored.

5. The management apparatus according to claim 1, wherein, if a plurality of network devices are selected as the network device to which the settings are to be distributed, a common setting supported by all of the plurality of network devices among the settings of the used template is displayed on the warning screen.

6. The management apparatus according to claim 1, wherein, in the task creation, after selection of the template is received, network devices corresponding to the device model identified by the template and network devices not corresponding to the device model identified by the template are displayed in an identifiable manner on a screen for selecting a network device to which the settings are to be distributed.

7. The management apparatus according to claim 1, wherein, in the task creation, after the selection of a template is received, network devices corresponding to the device model identified by the template are selectably displayed and network devices not corresponding to the device model identified by the template are is not displayed or is are displayed in a non-selectable state, on a screen for selecting a network device to which the settings are to be distributed.

8. The management apparatus according to claim 1, wherein the at least one processor further executes an instruction causing the management apparatus to create a template for task creation, and wherein the at least one processor receives selection of a device model of a network device, receives selection of a setting item supported by the device model, receives selection of a setting value corresponding to the setting item, creates a template including information of the selected device model and the combination of the setting item and the setting value, and manages the created template to create a task.

9. The management apparatus according to claim 1, wherein the network device includes a printer or a multifunction peripheral.

10. A control method for a management apparatus that manages network devices, the method comprising:

managing a template for distributing settings to a network device, wherein the template includes information identifying a device model of the network device;

receiving, during creation of a task, a user selection of the template;

receiving, during the creation of the task, a user selection of a network device to which the settings are to be distributed;

distributing the settings to the selected network device by executing the task; and displaying a warning screen before executing the task when the selected network devices does not correspond to the device model identified by the template.

11. A non-transitory storage medium storing a control program of a management apparatus causing a computer to perform each step of a control method for the management apparatus that manages network devices, the method comprising:

managing a template for distributing settings to a network device, wherein the template includes information identifying a device model of the network device;

receiving, during creation of a task, a user selection of the template;

receiving, during the creation of the task, a user selection of a network device to which the settings are to be distributed;

distributing the settings to the selected network device by executing the task; and displaying a warning screen before executing the task when the selected network device does not correspond to the device model identified by the template.

* * * * *